US010902021B2

(12) United States Patent
Chen et al.

(10) Patent No.: US 10,902,021 B2
(45) Date of Patent: Jan. 26, 2021

(54) AUTOMATED SELF-SCALING DATABASE SYSTEM FOR AUTOMATICALLY SCALING OUT READ OPERATIONS AND METHOD FOR IMPLEMENTING THE SAME

(71) Applicant: salesforce.com, inc., San Francisco, CA (US)

(72) Inventors: Bohan Chen, Redwood City, CA (US); Donald Tam, Hillsborough, CA (US)

(73) Assignee: salesforce.com, inc., San Francisco, CA (US)

( * ) Notice: Subject to any disclaimer, the term of this patent is extended or adjusted under 35 U.S.C. 154(b) by 166 days.

(21) Appl. No.: 16/139,255

(22) Filed: Sep. 24, 2018

(65) Prior Publication Data
US 2020/0097592 A1 Mar. 26, 2020

(51) Int. Cl.
*G06F 16/27* (2019.01)
*G06F 9/455* (2018.01)
*G06F 11/14* (2006.01)
*G06F 16/21* (2019.01)

(52) U.S. Cl.
CPC ........ *G06F 16/275* (2019.01); *G06F 9/45558* (2013.01); *G06F 11/1451* (2013.01); *G06F 16/214* (2019.01); *G06F 2009/4557* (2013.01); *G06F 2009/45575* (2013.01); *G06F 2201/84* (2013.01)

(58) Field of Classification Search
CPC .. G06F 16/275; G06F 16/214; G06F 9/45558; G06F 11/1451; G06F 2009/4557; G06F 2009/45575; G06F 2201/84
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |

(Continued)

OTHER PUBLICATIONS

United States Patent and Trademark Office, Non-Final Office Action in U.S. Appl. No. 15/440,810, dated Jan. 2, 2019.

*Primary Examiner* — Matthew J Ellis
(74) *Attorney, Agent, or Firm* — LKGlobal | Lorenz & Kopf, LLP

(57) ABSTRACT

A method and system for automatically scaling out read operations in an automated self-scaling database system are provided. An automated self-scaling database module analyzes telemetry information from a primary database and a first standby database to determine whether there is the need for upscaling storage capacity and computation resources of the database system for read operations. When upscaling is needed, a snapshot of the first standby database is taken and stored at a snapshot storage system. The snapshot is a complete copy of data stored in a storage system of the first standby database at a given time. Upscaling is then automatically initiated by provisioning a new standby database by automatically provisioning a new virtual machine (VM) and a new storage system for the new standby database, and then restoring the snapshot that was taken from the snapshot storage system to the new standby database.

14 Claims, 20 Drawing Sheets

(56) References Cited

U.S. PATENT DOCUMENTS

| | | | |
|---|---|---|---|
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B1 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,730,478 B2 | 6/2010 | Weissman | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven, et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,677,088 B1* | 3/2014 | Patil | G06F 11/1658 711/162 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0158862 A1* | 8/2003 | Eshel | G06F 16/10 |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0162836 A1 | 8/2004 | Aronoff et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2009/0201799 A1 | 8/2009 | Lundstrom et al. | |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0006932 A1* | 1/2013 | Akulavenkatavara | G06F 16/273 707/626 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0068584 A1* | 3/2014 | Lim | G06F 11/2094 717/168 |

(56) References Cited

U.S. PATENT DOCUMENTS

| | | |
|---|---|---|
| 2014/0136878 A1 | 5/2014 | Krishnan et al. |
| 2015/0074060 A1* | 3/2015 | Varadharajan ...... G06F 3/04842 |
| | | 707/649 |
| 2015/0222515 A1 | 8/2015 | Daisuke et al. |
| 2016/0188427 A1 | 6/2016 | Anjali et al. |
| 2017/0339158 A1 | 11/2017 | Usman et al. |
| 2018/0268017 A1* | 9/2018 | Parikh .................... G06F 16/27 |
| 2019/0392067 A1* | 12/2019 | Sonawane ............... G06F 16/25 |
| 2020/0026786 A1* | 1/2020 | Cadarette ............ G06F 11/1662 |
| 2020/0034458 A1* | 1/2020 | Mehta ................ G06F 16/2255 |

* cited by examiner

AUTOMATED SELF-SCALING DATABASE SYSTEM FOR AUTOMATICALLY SCALING OUT READ OPERATIONS AND METHOD FOR IMPLEMENTING THE SAME

TECHNICAL FIELD

Embodiments of the subject matter described herein relate generally to cloud-based computing. More particularly, embodiments of the subject matter relate to automated self-scaling database system for automatically scaling out read operations and method for implementing the same, for example, in cloud-based computing environment.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider.

High availability (HA) database architectures prevent downtime and data loss by using redundant systems and software to eliminate single points of failure. Administrator error, data corruption caused by system or software faults, or complete site failure can impact the availability of a database. The only way to prevent being impacted by single points of failure is to have a completely independent copy of a production database already running on a different system and ideally deployed at a second location, which can be quickly accessed if the production database becomes unavailable for any reason.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
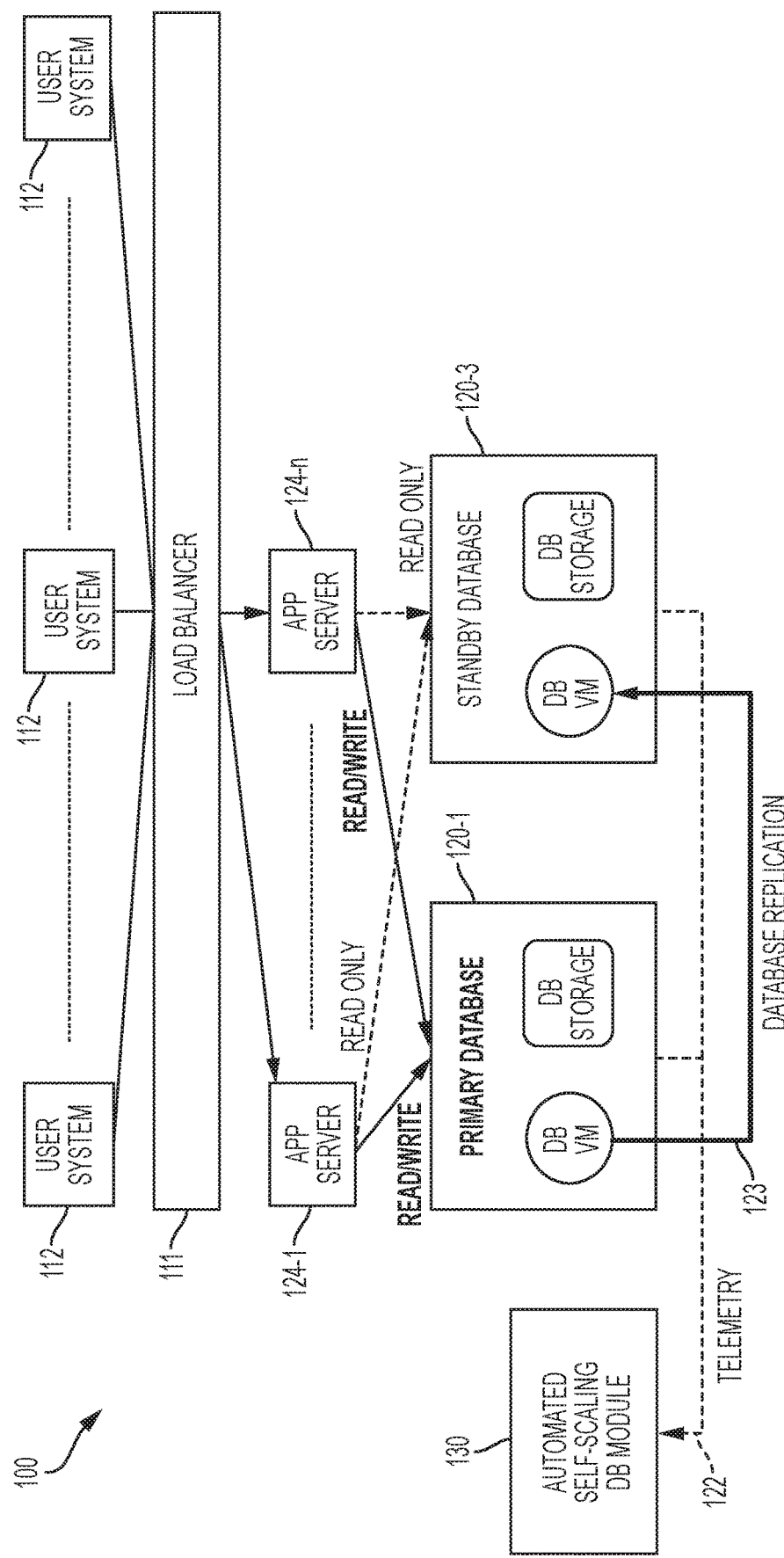
FIG. 1 is a block diagram that illustrates an automated self-scaling database system having an automated self-scaling module in accordance with the disclosed embodiments.

Auto-scaling technology is used mostly for stateless application services. With respect to stateful transactional database services, cloud vendors provide some automation or tools that can assist a database administrator in deciding whether to scale such stateful transactional database services, but the process of deciding whether to scale is left up to the database administrator based on their analysis of the system. The administrator needs to monitor many variables, such as the adequacy of computation and storage resources, and then make decisions whether to increase those computation and storage resources. If the administrator decides that additional computation and storage resources should be provisioned, the database administrator must then schedule maintenance and then take all of the necessary steps to upscale computation and storage resources, which can negatively impact service.

The exemplary embodiments presented here relate to self-scaling automated database systems, methods, procedures, and technology that can be implemented in a cloud-based computing environment. For example, the described subject matter can be implemented in the context of any cloud-based computing environment including, for example, a multi-tenant database system.

To address the issues discussed above, an automated self-scaling database system and related methods are provided for implementing an automated self-scaling database system in a multi-tenant, cloud-based computing environment. This automated self-scaling database system allows for vertical and horizontal scaling of a multi-tenant database system in a cloud-based computing environment.

In one embodiment, an automated, self-scaling multi-tenant database system is provided in a cloud environment. The automated self-scaling multi-tenant database system includes a primary database, a standby database that is a replica of the primary database, an application server that writes data to the primary database and reads data from the primary and standby databases, and an automated self-scaling module (SSM). The automated SSM automatically initiates and executes self-scaling of the transactional primary and standby databases. For example, the automated SSM can monitor and analyze telemetry information and trending data (e.g., that indicates the capacity and usage of the primary and standby databases) to predict or project when the primary database needs to be scaled up, and if so, and can automatically upscale (or scale up) the multi-tenant database system by provisioning upscaled computation resources and database storage at a "new" primary database such that the new primary database has increased computation resources and database storage relative to the original primary database (e.g. maximum computation resources for a single virtual machine and the maximum database storage capacity that can be provided by a particular cloud environment). For example, in one embodiment, computation resources of a virtual machine (VM) at the new "scaled up" primary database can be increased up to a maximum that the cloud provider allows, and likewise, storage space and/or throughput, such as input-output per second (IOPS), of the new "scaled up" primary database can be increased to a maximum that the cloud provider allows. During database switchover of the primary database role from the old primary database to the new "scaled up" primary database, a read-only application mode is used to avoid complete outages of the database system. During the read-only application mode, read-only traffic/requests are directed to the old primary database (or the new standby database), and the read/write traffic/requests are routed to the new "scaled up" primary database.

In another embodiment, a method and system are provided for automatically scaling out read operations in an automated self-scaling database system (e.g., the automated self-scaling database module can scale out read by provisioning more standby databases). To do so, the automated self-scaling database module analyzes telemetry information from a primary database and a first standby database to determine whether there is the need for upscaling storage capacity and computation resources of the database system for read operations. When upscaling is needed, a snapshot of the first standby database is taken and stored at a snapshot storage system. The snapshot is a complete copy of data stored in a storage system of the first standby database at a given time. Upscaling is then automatically initiated by provisioning a new standby database by automatically provisioning a new virtual machine (VM) and a new storage system for the new standby database, and then restoring the snapshot that was taken from the snapshot storage system to the new standby database.

In another embodiment, write-scaling for multi-tenant databases is provided by creating new primary databases and automatically distributing tenants among the new primary databases. The automated SSM can scale out write capability by provisioning one or more new primary databases and distributing the tenants between the primary databases. To explain further, in one embodiment, a method and system are provided for automatically scaling out write operations in an automated self-scaling database system that process read requests and write requests from a plurality of tenants. The automated self-scaling database system initially includes an automated self-scaling database module, a first primary database and a first standby database. Telemetry information from the first primary database is regularly and automatically analyzed to determine whether the first primary database has reached a maximum computation and storage capacity such that there is the need for upscaling storage capacity and computation resources of the database system for write operations. If so, a write scaling process is automatically initiated so that the system can be upscaled. To do so, a snapshot of the first standby database is taken, and stored at a snapshot storage system. The snapshot is a complete copy of data stored in a storage system of the first standby database at a given time. A new primary database can then be automatically provisioned, and once it is active, the plurality of tenants can be distributed among the first primary database and the new primary database (e.g., equally distributed or distributed based on workload, etc.) such that the first primary database handles read requests and write requests that originate from a first group of the tenants, and the new primary database handles read requests and write requests that originate from a second group of the tenants. In one embodiment, tenants (N/2+1) to N are blocked on the original primary database, and the delta changes are applied to the new, independent primary database. The original primary database then only serves tenant 1 to N/2, and the data of tenant (N/2+1) to N is dropped to release space. Conversely, new, independent primary database only serves tenants (N/2+1) to N, and the data of tenant 1 to N/2 is dropped to release space. The automated SSM then updates application servers regarding the tenant-DB mappings.

As such, the disclosed embodiments can provide an auto-scaling, stateful, multi-tenant database system that requires no human decision-making or intervention. The disclosed embodiments can be used to maintain the transactional database atomicity, consistency, isolation, and durability (ACID) compliance.

FIG. 1 is a block diagram that illustrates an automated self-scaling database system 100 having an automated self-scaling module 130 in accordance with the disclosed embodiments. In one embodiment, the automated self-scaling database system 100 is a cloud-based database system (e.g., a multi-tenant, cloud-based database system).

The automated self-scaling database system 100 includes a number of user systems 112, a number (n) of application servers 124, wherein n is greater than or equal to one, a load balancer 111 that controls the routing of the user system 112 traffic to applications servers 124, a primary database 120-1, a standby database 120-3, and an automated self-scaling module 130 that interacts with the application servers 124, the primary database 120-1, and the standby database 120-3. In this particular implementation, one primary database and one standby database are shown, but fewer or more primary and standby databases can be included depending on the particular implementation.

As illustrated, each database 120 includes a database virtual machine (VM) that performs various database computing processes, joins, sorting, queries, or transactions, and a storage sub-system which includes storage management software and hardware that stores transactional data. The database VM can read data from the storage sub-system, and write data to the storage sub-system. Together, the storage sub-system and the database VM (including its software components or modules) provide the capability for processing and storing data (or transactions) that can be inserted, queried, updated and deleted via query languages and other interfaces. Although not illustrated, each database can include other hardware.

A Data Guard configuration includes one production database that functions in the primary role, also referred to herein as the primary database 120-1. This is the database that is accessed by applications that are executed by the application servers 124. The user systems 112 interact with applications executed at the application servers 124. In response, the applications executed at the application servers 124 communicate read and write (R/W) requests to a primary database 120-1. For example, the applications 124 can write data to store it at the primary database 120-1, and can access data at the primary database 120-1 by reading it from the primary database 120-1 when the primary database 120-1 is available and operating normally with the role of "primary" database. This read/write transaction capability is represented by the solid arrow between the application server 124 and primary database 120-1 that is labelled Read/Write in FIG. 1. Depending on the implementation, the primary database 120-1 can be either a single-instance Oracle database or an Oracle Real Application Clusters database.

The standby database 120-3 is an independent copy of the primary (or production) database 120-1 that can be used for disaster protection in a high availability environment. In other words, the standby database 120-3 is a transactionally consistent or "backup" copy of the primary database 120-1. The standby database 120-3 receives data 123 replicated from the primary database 120-1 synchronously or asynchronously when a transaction is committed and stored at the primary database 120-1. This is illustrated in FIG. 1 by the arrow 123 extending between the primary database 120-1 and the standby database 120-3 that is labeled "Database Replication". For example, once the standby database 120-3 is created and incorporated into a Data Guard configuration, the standby database 120-3 is automatically maintained by transmitting redo data from the primary database 120-1 and then applying the redo to the standby database 120-3. In some implementations, the standby database 120-3 can be either a single-instance Oracle database or an Oracle Real Application Clusters (RAC) database (as is the case with the primary database 120-1).

As will be explained below in certain situations, when a read-only application mode is enabled, the applications at the application servers 124 may have read-only access to data stored at the standby database 120-3 meaning that applications executed at the application servers 124 may communicate read-only requests to the standby database 120-3 such that they can only read data from the standby database 120-3, but not write data to the standby database 120-3. This read-only capability is represented in FIG. 1 by the dashed-line arrows extending between the application servers 124 and the standby database 120-3 that is labeled "Read Only."

In some cases, the computation resources and/or storage capacity of the primary database 120-1 can start to become inadequate for some reason. To address this issue, the disclosed embodiments can provide an automated self-scaling module 130. As will be explained in greater detail below, the automated self-scaling module 130 can provide automatic upscaling capability to upscale computation and storage resources of a primary database. The automated self-scaling module 130 can also provide automatic read scale out capability by automatically provisioning additional standby databases, and also provide automated write scale out capability by provisioning additional primary databases. Further details of the automated self-scaling module 130 will now be described with reference to FIG. 2.

Figure 2:
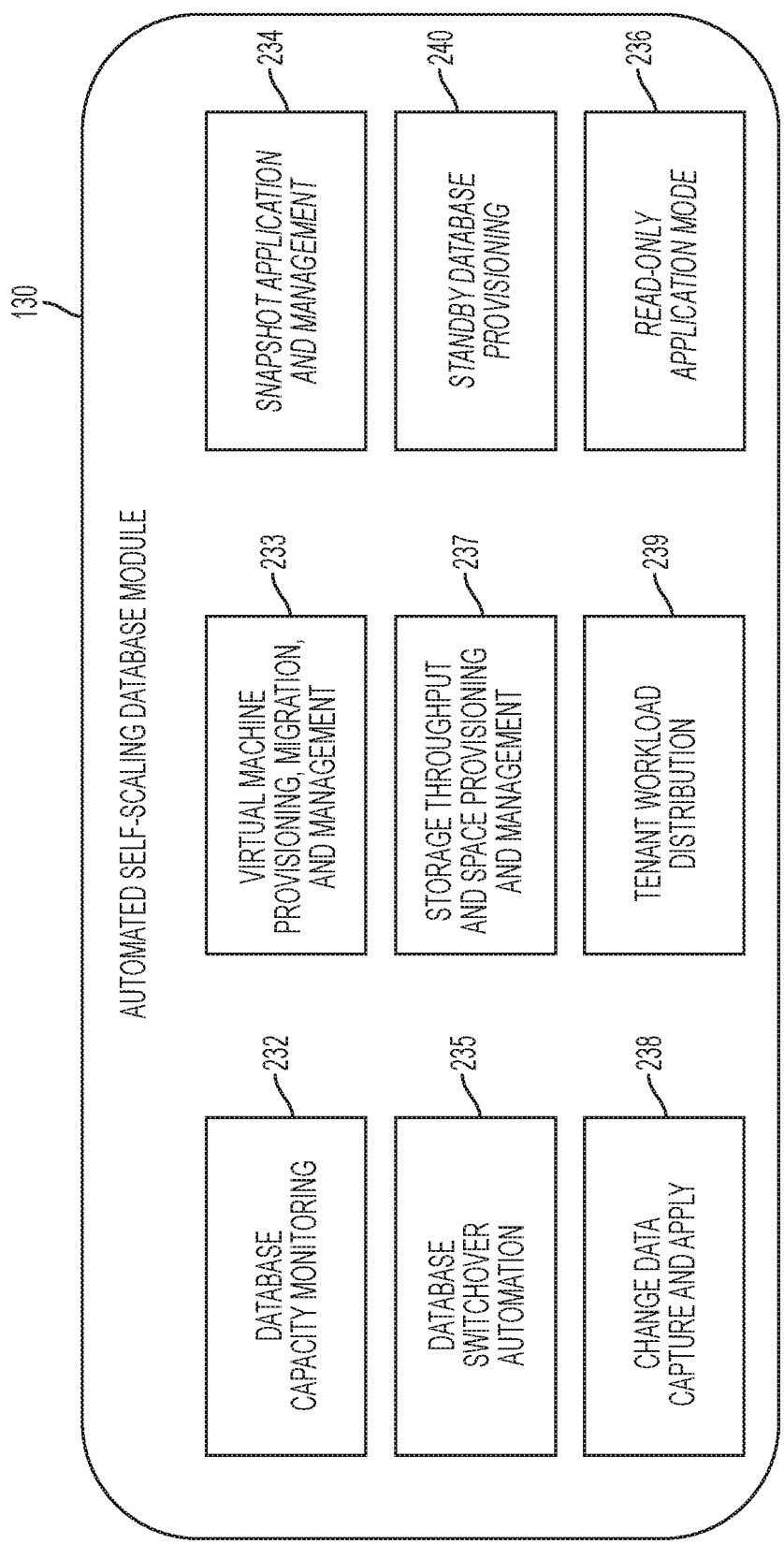
FIG. 2 shows a block diagram of various modules of an automated self-scaling module in accordance with the disclosed embodiments.

FIG. 2 is a block diagram that illustrates various sub-modules of an automated self-scaling module 130 in accordance with the disclosed embodiments. The various sub-modules of the automated self-scaling database module 130 can include: a database capacity monitoring sub-module 232, a virtual machine provisioning, migration, and management sub-module 233, a storage throughput provisioning and management sub-module 237, a standby database provisioning sub-module 240, a database switchover automation sub-module 235, a read-only application mode sub-module 236, a snapshot application and management sub-module 234, a change data capture and apply sub-module 238, and a tenant workload distribution sub-module 239. The self-scaling module 130 and sub-modules thereof can interact with vendors' technologies via the vendors' API. Examples of such technologies include Oracle™ Data Guard replication and failover technologies, Amazon Web Services (AWS)™ snapshot technologies, etc.

The database capacity monitoring sub-module 232 includes computer-executable instructions that when executed by a processor of the automated self-scaling module 130 cause the processor to monitor storage capacity and/or use of computing resources at one or more of databases 120 to determine whether or not automated self-scaling should be performed to create a new primary database. For example, in one embodiment, the database capacity monitoring sub-module 232 can analyze telemetry information received from the primary database 120-1 to project whether the storage capacity and the computation resources of the primary database 120-1 should be upscaled, and if so, can automatically initiate upscaling of the storage capacity and the computation resources of the primary database 120-1 and the standby database 120-3.

The virtual machine provisioning, migration, and management sub-module 233 includes computer-executable instructions that when executed by a processor of the automated self-scaling module 130 cause the processor to provision, migrate, and manage a virtual machine at a database 120 that will become the new primary database during automated self-scaling. For example, the virtual machine provisioning, migration, and management sub-module 233 can stop the virtual machine of the standby database 120-3, migrates to a new upscaled virtual machine (VM) at the standby database 120-3, and then start the new upscaled virtual machine (VM) at the standby database 120-3 to upscale computation resources at the standby database 120-3 (e.g., so that it has increased computation resources with respect to the computation resources of the virtual machine of the primary database 120-1).

Similarly, the storage throughput provisioning and management sub-module 237 includes computer-executable instructions that when executed by a processor of the automated self-scaling module 130 cause the processor to provision and manage storage resources (e.g., throughput in terms of input-output per second (IOPS) and storage space of capacity) at a database 120 that will become the new primary database during automated self-scaling. For example, in one embodiment, the storage throughput provisioning and management sub-module 237 increases storage capacity (e.g., storage throughput and/or storage space size) of the standby database 120-3 such that the standby database 120-3 has upscaled storage capacity with respect to the storage capacity of the primary database 120-1.

The database switchover automation sub-module 235 includes computer-executable instructions that when executed by a processor of the automated self-scaling module 130 cause the processor to automatically switch roles of databases 120 from primary to standby and vice-versa. As used herein, "automatically" refers to actions taken by the automated self-scaling module 130 or a sub-module thereof without manual intervention. For example, in one embodiment, the database switchover automation sub-module 235 initiates a switchover process to transition a primary database role in the database system 100 from the primary database 120-1 to the standby database 120-3, and then assigns the standby database 120-3 the primary database role in the database system 100 such that the standby database becomes a new primary database, and assigns the primary database 120-1 a standby database role in the database system 100 such that the primary database becomes a new standby database. The new primary database can have upscaled computation resources and upscaled storage capacity with respect to the new standby database 120-1. Once the database switchover automation sub-module 235 determines that the switchover process is complete, it can place the new primary database 120-3 in a read/write mode that allows the application servers 124 to have full read/write access.

In one embodiment, the database switchover automation sub-module 235 can automatically implement Oracle's Data Guard™ technology to switch roles of databases 120 from primary to standby and vice-versa. Data Guard™ forms an extension to the Oracle relational database management system (RDBMS). In Oracle's Data Guard system, a database operates in one of the following mutually exclusive roles: primary or standby. Oracle Data Guard technology can help eliminate single points of failure, and prevents data loss and downtime in a simple yet economical manner by maintaining a synchronized physical replica of a production or primary database at a remote location. Oracle Data Guard maintains these standby databases as copies of the production database. Then, if the production database becomes unavailable because of a planned or an unplanned outage, Oracle Data Guard can switch any standby database to the production role, minimizing the downtime associated with the outage. In one embodiment, the database switchover automation sub-module 235 can implement Data Guard technology. Data Guard normally enables a database administrator to change these roles dynamically by issuing the SQL statements, or by using either of the Data Guard broker's interfaces, but one limitation of Data Guard technology is that it does not guarantee the automatic provisioning of a new standby database after a role change (e.g., when primary database is not available due to various types of failures, such as hardware failures on the primary database VM or storage sub-system).

The standby database provisioning sub-module 240 includes computer-executable instructions that when executed by a processor of the automated self-scaling module 130 cause the processor to provision one or more standby databases using the most recent snapshot data that is stored at the snapshot storage system. The standby database provisioning sub-module 240 can control replication. For example, the standby database provisioning sub-module 240 can temporarily suspend database replication on the standby database 120-3 while migrating to the new upscaled virtual machine (VM) at the standby database 120-3, but then resume replication from the primary database 120-1 to the standby database 120-3 to synchronize the standby database 120-3 with the primary database 120-1 so that transactions from the primary database are replicated to the standby database 120-3.

The read-only application mode sub-module 236 includes computer-executable instructions that when executed by a processor of the automated self-scaling module 130 cause the processor to enable read-only-application mode at one or more databases to temporarily allow the applications served by application servers 124 to have read-only access to data stored at those database(s). For example, in one embodiment, the read-only application mode sub-module 236 can temporarily notify application servers 124 to suspend all write requests to the primary database 120-1 and to only allow read requests to the standby database 120-3 so that the application server starts directing all read-only traffic back to standby database 120-3. Once the standby database 120-3 has transitioned roles and become the new primary database 120-3, the read-only application mode sub-module 236 can then notify the application servers 124 to start allowing full read/write access to the new primary database 120-3 (so that the application servers 124 direct read/write requests to the new primary database 120-3), and to stop sending read-only requests to the standby database 120-3 and instead direct the read-only requests to the new standby database 120-1. Allowing read-only access is beneficial for improved customer experience because while transactions cannot be committed, the application servers 124 can still read data from the database(s) and satisfy customer query and other read-only requests while it is being determined whether a role transition should take place.

The snapshot application and management sub-module 234 includes computer-executable instructions that when executed by a processor of the automated self-scaling module 130 cause the processor to take a snapshot of data stored in storage at one of the databases 120. Snapshotting refers to the process of copying (or snapshotting) the complete database data on the storage at a point in time. In one embodiment, the snapshot application and management module 234 executes in the background to regularly or periodically capture snapshots of data stored at a database 120, and stores the snapshots of data at a snapshot storage system. For instance, in one implementation, the snapshot application and management module 234 can take an hourly snapshot of a database 120-3 and store the snapshot data at a snapshot storage system. The snapshot data is then available to be used for data restoration or for provisioning new databases. Restoring refers to the process of restoring a snapshot copy onto a different database and storage. It does not involve any transactions or changes and is a one-time operation. These two techniques can be combined, for example, to add a new standby database. For example, this can be done by first taking a snapshot as of time X from the primary or from one of its standby databases. The snapshot can be stored in a snapshot storage system (not shown in FIG. 2) and then used to restore data from the snapshot at storage of another database 120. The snapshot can be restored onto a new database VM/storage. Replication can then be enabled to replicate the transactions since the time X to the "new" standby database. Once the standby is caught up with the primary, the standby can be used for application read off-loading. The replication will continue to keep the standby in-sync.

The change data capture and apply sub-module 238 includes computer-executable instructions that when executed by a processor of the automated self-scaling module 130 cause the processor to identify and capture data that has been inserted to, updated in, or removed from tables in a relational database. The change data capture and apply sub-module 238 operates at the table level (instead of the database-level replication) and can be further filtered based on conditions defined. For instance, the change data capture and apply sub-module 238 can capture data changes from tables for specific tenants only (based on tenant id in the tables). The change data captured can be made available and be applied to a different target database or data store. In some cases, it can be transformed based on pre-defined transformation rules and then be applied to the target. The change data capture and apply sub-module 238 is used in write-scaling to capture change data on the primary database for specific tenants (who would be moved to a new primary database) and then apply the changes to a newly provisioned (primary) database that these tenants are migrating to.

The tenant workload distribution sub-module 239 includes computer-executable instructions that when executed by a processor of the automated self-scaling module 130 cause the processor to perform various acts, such as, notifying application servers 124 to enable read-only application mode to temporarily block write requests of some tenants (e.g., temporarily block some tenants and apply any changes for these tenants to a new primary database using a data change capture and apply service 238), determining the tenants distribution between the newly created primary database(s), notifying application servers 124 of new tenant-database mapping, routing read/write requests from tenants to a newly provisioned primary database, and deleting data of certain tenants from primary databases to release the storage space.

Referring again to FIG. 1, initially the automated self-scaling module 130 is operating in an initial running state (e.g., prior to automated self-scaling). In the initial running state, the application servers 124 direct read/write requests to the primary database 120-1 and read-only requests to the standby database 120-3. In accordance with the disclosed embodiments, the primary database 120-1 and the standby database 120-3 continuously send telemetry information to the automated self-scaling database module 130. The telemetry information includes information or metrics that indicate one or more of: storage capacity or storage space utilization of the database 120, CPU utilization of the database 120, memory utilization of the database 120, active sessions at the database 120, connection wait time of the database 120, request response time of the database 120, storage throughput (e.g., input/output per second (IOPS)) of the database 120, storage queue depth of the database 120, and information regarding usage of any other resources at the database 120.

Various tasks and operations performed by the various elements in FIGS. 1 and 2 will be described in greater detail below with reference to FIGS. 3A-8C. For example, certain tasks and operations performed at the primary site 110, including tasks and operations performed by various modules of the automated self-scaling module 130 shown in FIG. 2, will now be described below with reference to FIGS. 3A-8C and with continued reference to FIGS. 1 and 2.

Figure 3A:
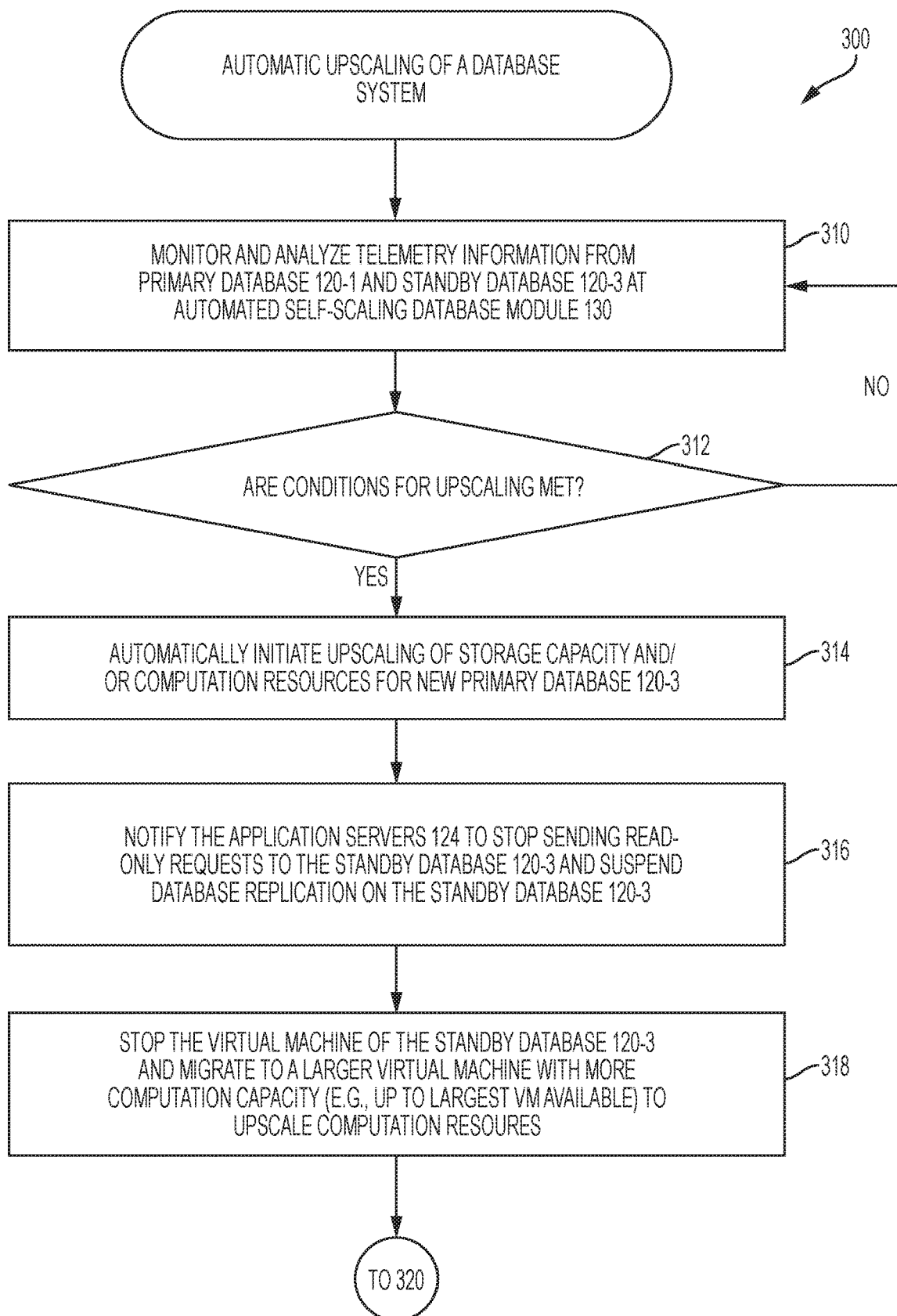
FIGS. 3A and 3B are collectively a flow chart that illustrates an exemplary method for providing an automated self-scaling database system in accordance with the disclosed embodiments.
Figure 3B:
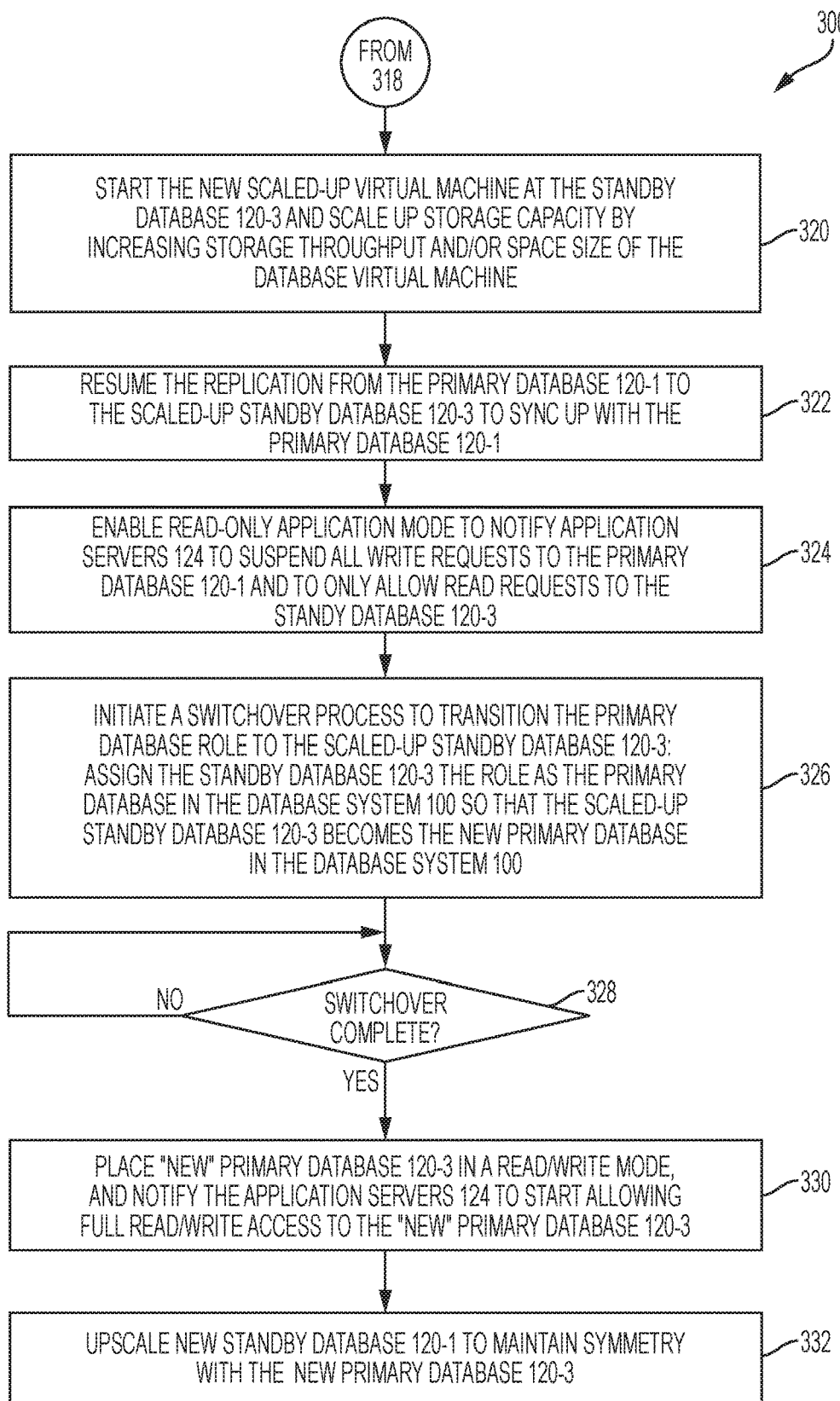
Figure 4A:
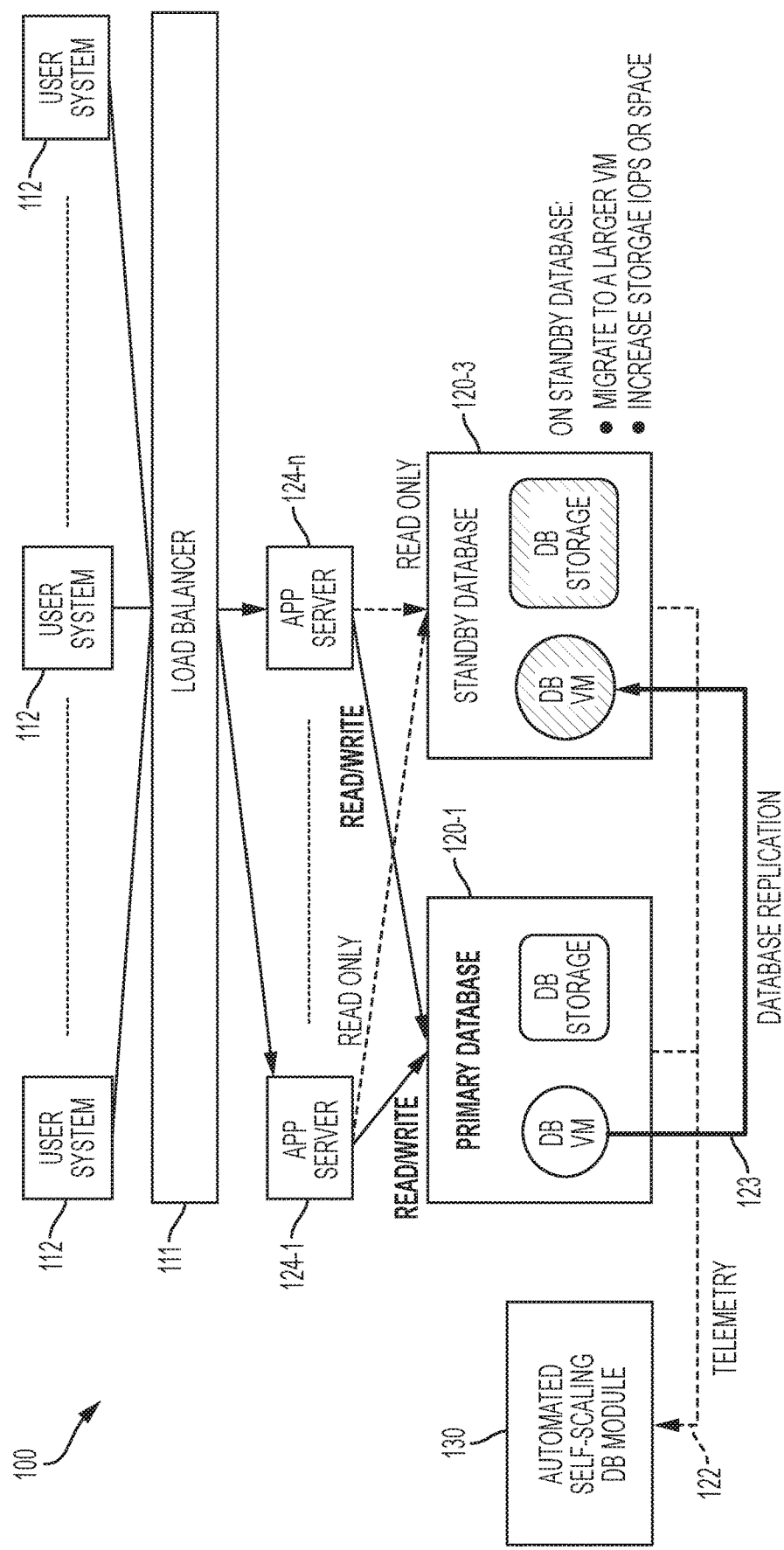
FIGS. 4A-4C are block diagrams that illustrate an automated self-scaling database system and how it functions to achieve automatic upscaling capability in accordance with the disclosed embodiments.
Figure 4B:
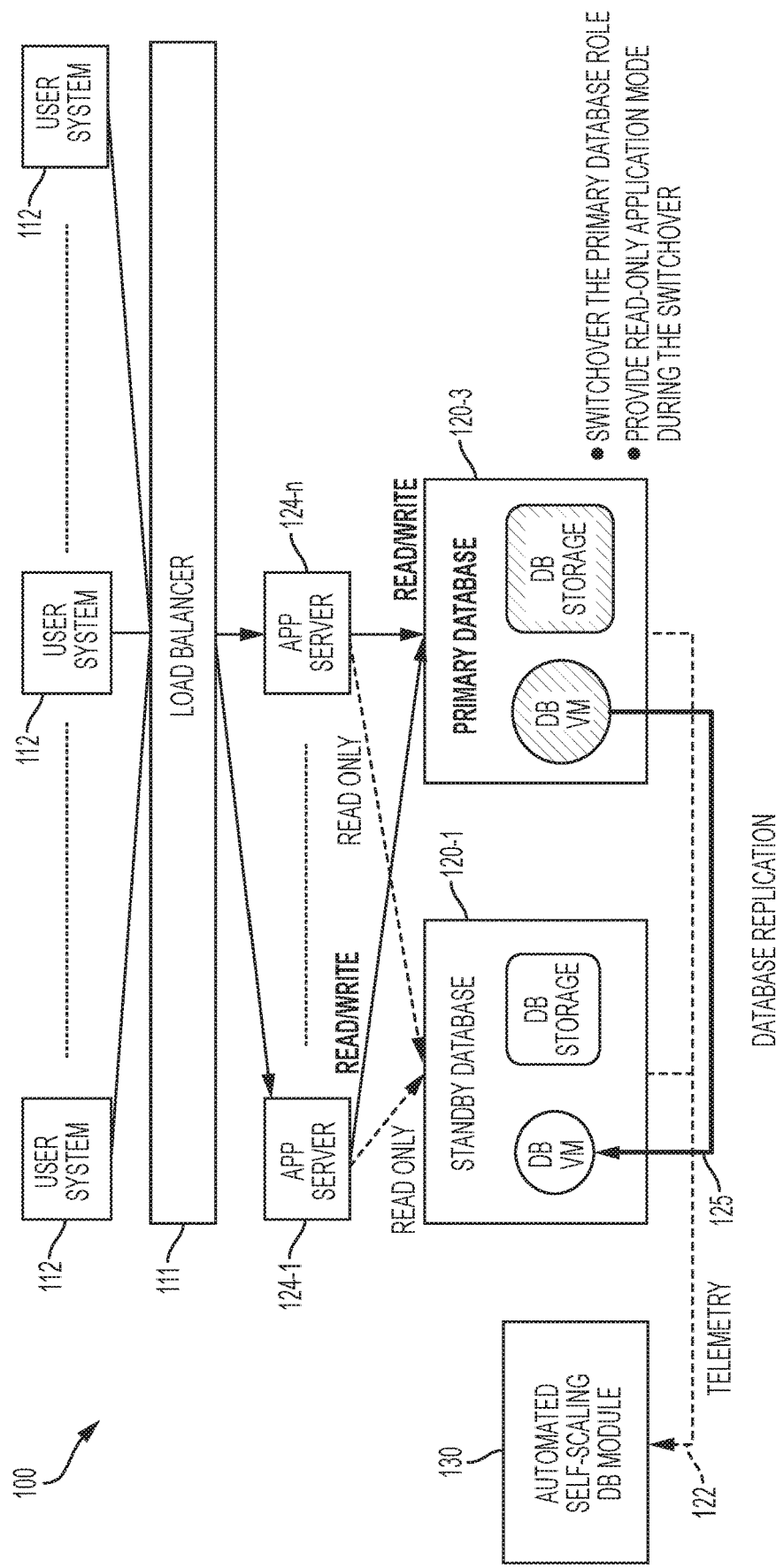
Figure 4C:
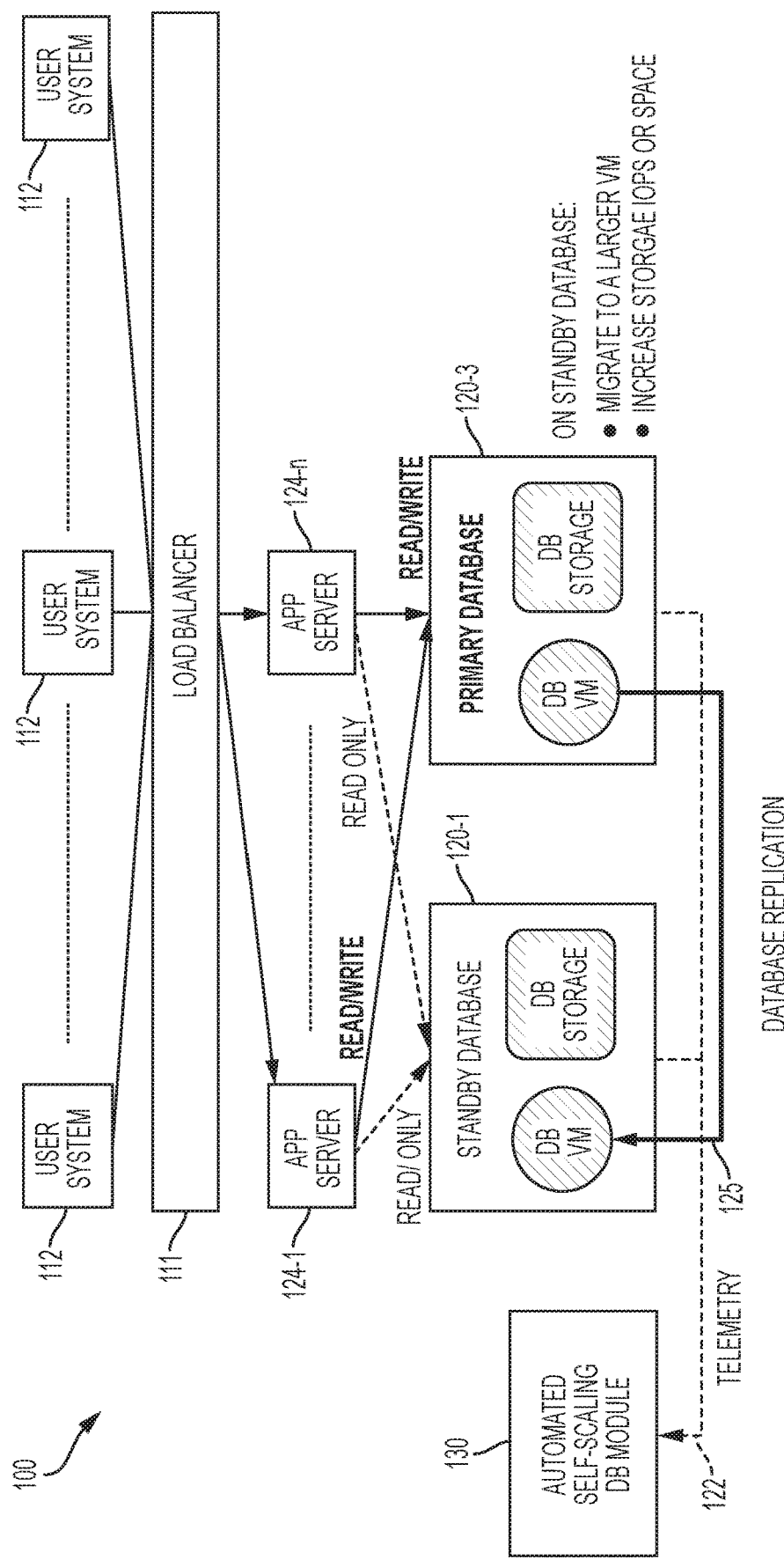

FIGS. 3A and 3B are collectively a flow chart that illustrates an exemplary method for automatically upscaling computation resources and storage capacity of a database system in accordance with the disclosed embodiments. FIGS. 3A and 3B will be described with reference to FIGS. 4A-4C. FIGS. 4A-4C are block diagrams that illustrate an automated self-scaling database system and how it functions to achieve automatic upscaling capability in accordance with the disclosed embodiments. In other words, FIGS. 4A-4C collectively illustrate the database system 100 of FIG. 1 and how computation resources and storage capacity of the database system can be automatically upscaled in accordance with the disclosed embodiments. As a preliminary matter, it should be understood that steps of the method 300 are not necessarily limiting, and that steps can be added, omitted, and/or performed simultaneously without departing from the scope of the appended claims. It should be appreciated that the method 300 may include any number of additional or alternative tasks, that the tasks shown in FIGS. 3A and 3B need not be performed in the illustrated order, and that the method 300 may be incorporated into a more comprehensive procedure or process having additional functionality not described in detail herein. Moreover, one or more of the tasks shown in FIGS. 3A and 3B could potentially be omitted from an embodiment of the method 300 as long as the intended overall functionality remains intact. It should also be understood that the illustrated method 300 can be stopped at any time. The method 300 is computer-implemented in that various tasks or steps that are performed in connection with the method 300 may be performed by software, hardware, firmware, or any combination thereof. For illustrative purposes, the following description of the method 300 may refer to elements mentioned above in connection with FIGS. 1 and 2. In certain embodiments, some or all steps of this process, and/or substantially equivalent steps, are performed by execution of processor-readable instructions stored or included on a processor-readable medium. In other words, sub-modules of the automated self-scaling module 130 will be described as performing various acts, tasks or steps, but it should be appreciated that this refers to processing system(s) executing instructions to perform those various acts, tasks or steps. Depending on the implementation, some of the processing system(s) can be centrally located, or distributed among a number of systems that work together.

At step 310 of FIG. 3A, the automated self-scaling database module 130 receives the telemetry information from the primary database 120-1 and the standby database 120-3 on a regular basis (e.g., periodically or in response to some trigger event or condition that occurs), and the database capacity monitoring sub-module 232 of the automated self-scaling database module 130 can monitor and analyze the telemetry information to project or predict whether there is the need for upscaling the storage capacity and computation resources of the databases.

When the database capacity monitoring sub-module 232 of the automated self-scaling database module 130 determines (at 312), based on the telemetry information) that upscaling is needed, the method 300 proceeds to 314, where the automated self-scaling database module 130 can automatically initiate the upscaling (or scaling up) of the storage capacity and computation resources of the primary database 120-1.

To upscale, at 316, the read-only application mode sub-module 236 notifies the application servers 124 to stop sending read-only requests to the standby database 120-3, and the standby database provisioning sub-module 240 suspends database replication on the standby database 120-3. At 318, the virtual machine provisioning, migration, and management sub-module 233 stops a virtual machine of the standby database 120-3, and migrates to a larger virtual machine with more computation capacity (e.g., up to the largest VM available) to upscale computation resources. The virtual machine provisioning, migration, and management sub-module 233 can provision upscaled computation resources at the standby database 120-3. For example, the virtual machine provisioning, migration, and management sub-module 233 of the automated self-scaling database module 130 can scale up to the largest virtual machine that the cloud environment provides.

At 320, the virtual machine provisioning, migration, and management sub-module 233 starts the new, scaled-up VM at the standby database 120-3, and the storage throughput provisioning and management sub-module 237 scales up the storage capacity by increasing the storage throughput and/or space size of the database virtual machine. The storage throughput provisioning and management sub-module 237 can provision upscaled storage capacity at the standby database 120-3, which will eventually become the "new" primary database 120-3. In one embodiment, the storage throughput provisioning and management sub-module 237 can increase the storage throughput and/or increase the space size of database (DB) storage using the Application Programming Interface (API) provided by the cloud environment up to the limit imposed by the cloud environment. At this point, the standby database 120-3 will have increased or scaled-up computation resources and storage capacity in comparison to the primary database 120-1.

At 322, the standby database provisioning sub-module 240 resumes the replication from the primary database 120-1 to the scaled-up standby database 120-3 to sync up with the primary database 120-1 (e.g., to synchronize the new primary database 120-3 with the old primary database 120-1). The changes/transactions from the primary database are replicated to a standby database 120-3. The standby database 120-3 can then apply these transactions to be in-sync with the primary database 120-1. Replication can be a continuous operation and can be suspended and resumed.

At 324, the read-only application mode sub-module 236 enables the read-only application mode to notify the application servers 124 to suspend all the write requests to the primary database 120-1 and to only allow read requests to the standby database 120-3. The application servers 124 can then start directing all of the read-only traffic back to standby database 120-3. This helps to avoid a complete outage of database system to users (e.g., customers).

At 326, the database switchover automation sub-module 235 initiates a switchover process to transition the primary database role to the scaled-up standby database 120-3, and then assigns the standby database 120-3 the role as the primary database in the database system 100. After step 326, the scaled-up standby database 120-3 becomes the "new" primary database (with the scaled-up computation resources and storage capacity) and the "old" primary database 120-1 becomes the "new" standby database in the database system 100. For example, in one embodiment shown in FIG. 4B, the database switchover automation sub-module 235 initiates or triggers a managed Data Guard switchover operation to transition the "primary" role to the scaled-up standby database 120-3, and the previous primary database 120-1 assumes a "standby" role.

At 328, the database switchover automation sub-module 235 determines whether switchover is complete, and is so, the method 300 proceeds to 330.

At 330, the database switchover automation sub-module 235 places the "new" primary database 120-3 in a read/write mode that allows the application servers 124 to have full read/write access, and the read-only application mode sub-module 236 notifies the application servers 124 to start allowing full read/write access to the new scaled-up primary database 120-3. As such, the application servers 124 direct read/write requests to the new primary database 120-3 and direct read-only requests to the standby database 120-1 (e.g., read/write requests from the application servers 124 will be routed to the new primary database 120-3, and read-only requests from the application servers 124 will be routed to the new standby database 120-1).

At 332, the new standby database 120-1 can continuously send telemetry information to the automated self-scaling database module 130, which can then be evaluated or analyzed by the database capacity monitoring sub-module 232, to project whether storage capacity and computation resources of the new standby database 120-1 should be upscaled. When the database capacity monitoring sub-module 232 determines, based on the telemetry information, that the new standby database 120-1 should be upscaled, the database capacity monitoring sub-module 232 can automatically initiate upscaling of the storage capacity and the computation resources of the new standby database 120-1 to maintain symmetric storage capacity and symmetric computation resources with the new primary database 120-3. As shown in FIG. 4C, the automated self-scaling database module 130 can scale up the computation resources and storage capacity of the new standby database 120-1 to maintain the symmetric capacity with the new primary database 120-3.

Automated Read Scale Out

After upscaling database computation and storage capacity (as described with reference to FIGS. 3A-4C) at the new primary database 120-3, the automated self-scaling database module 130 can decide, based on the capacity telemetry data 122, that further scaling for the read operation is necessary. Since the maximum computation and storage capacity supported for a single virtual machine by the cloud environment has been reached, as will now be described below with reference to FIGS. 5-6B, the automated self-scaling database module 130 can automatically provision more standby databases 120-5 for the read scaling.

Figure 5:
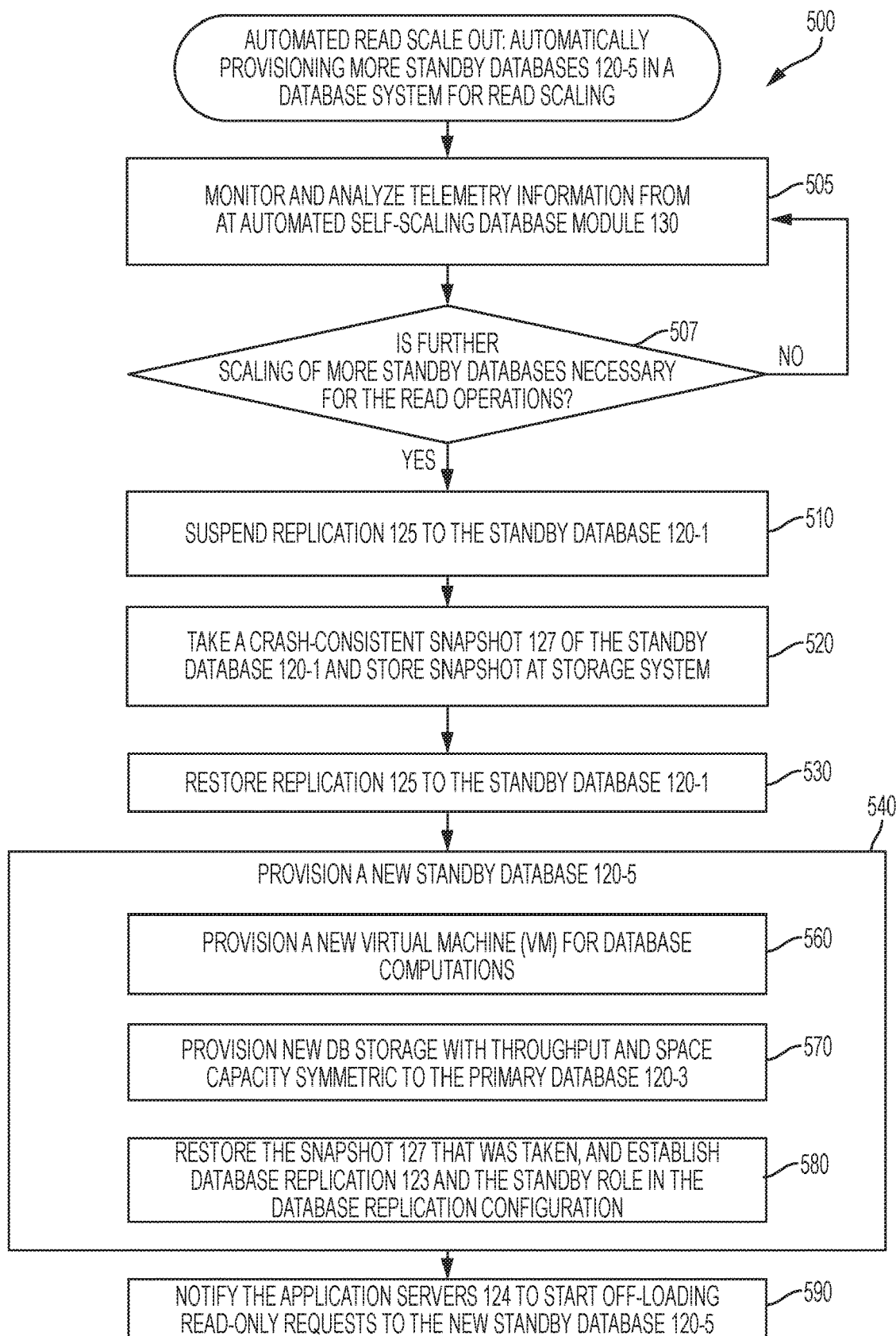
FIG. 5 is a flow chart that illustrates another exemplary method for providing an automated self-scaling database system with automated read scale out in accordance with the disclosed embodiments.
Figure 6A:
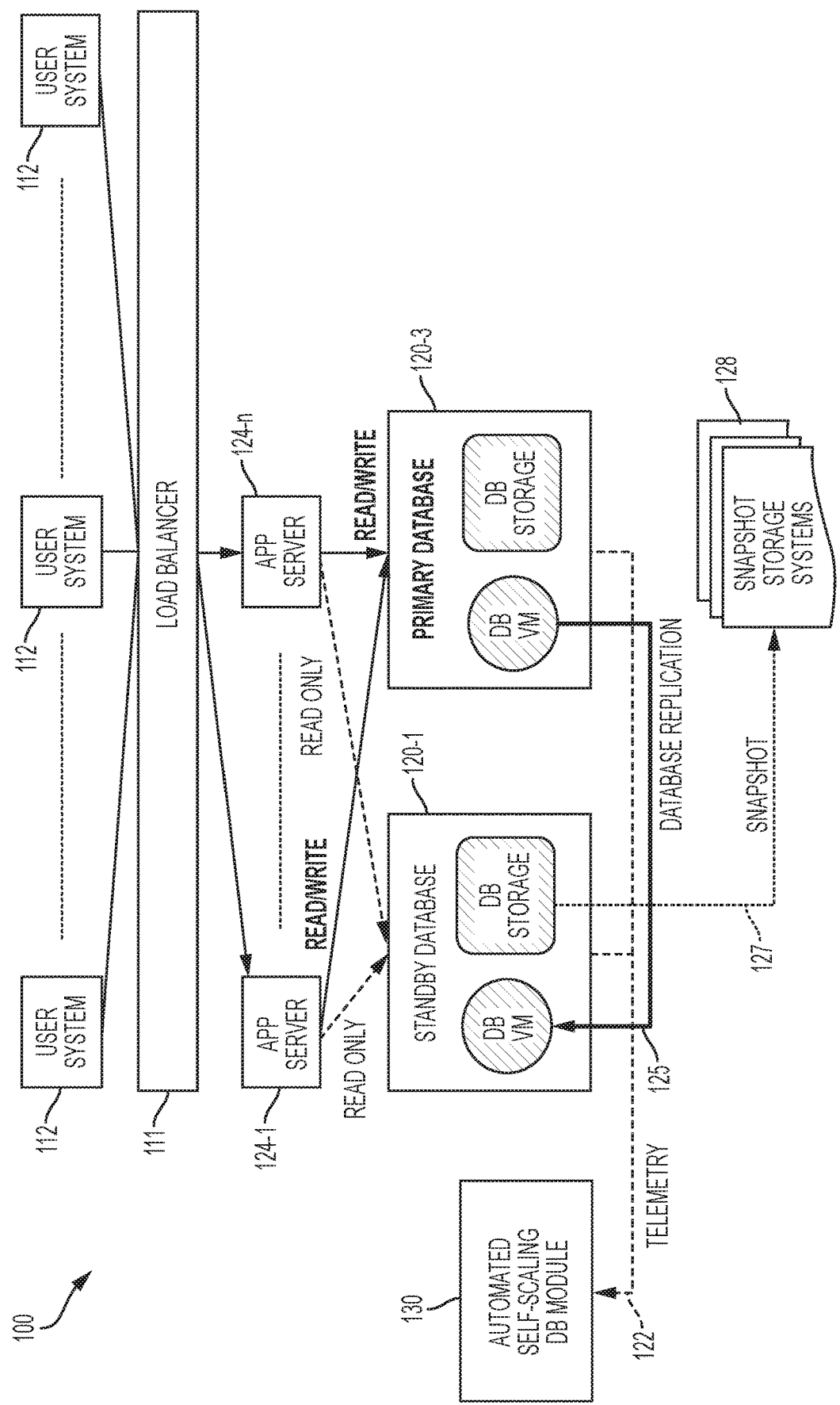
FIGS. 6A-6B are block diagrams that illustrate an automated self-scaling database system of FIG. 1 and how it functions to achieve automatic read upscaling capability in accordance with the disclosed embodiments.
Figure 6B:
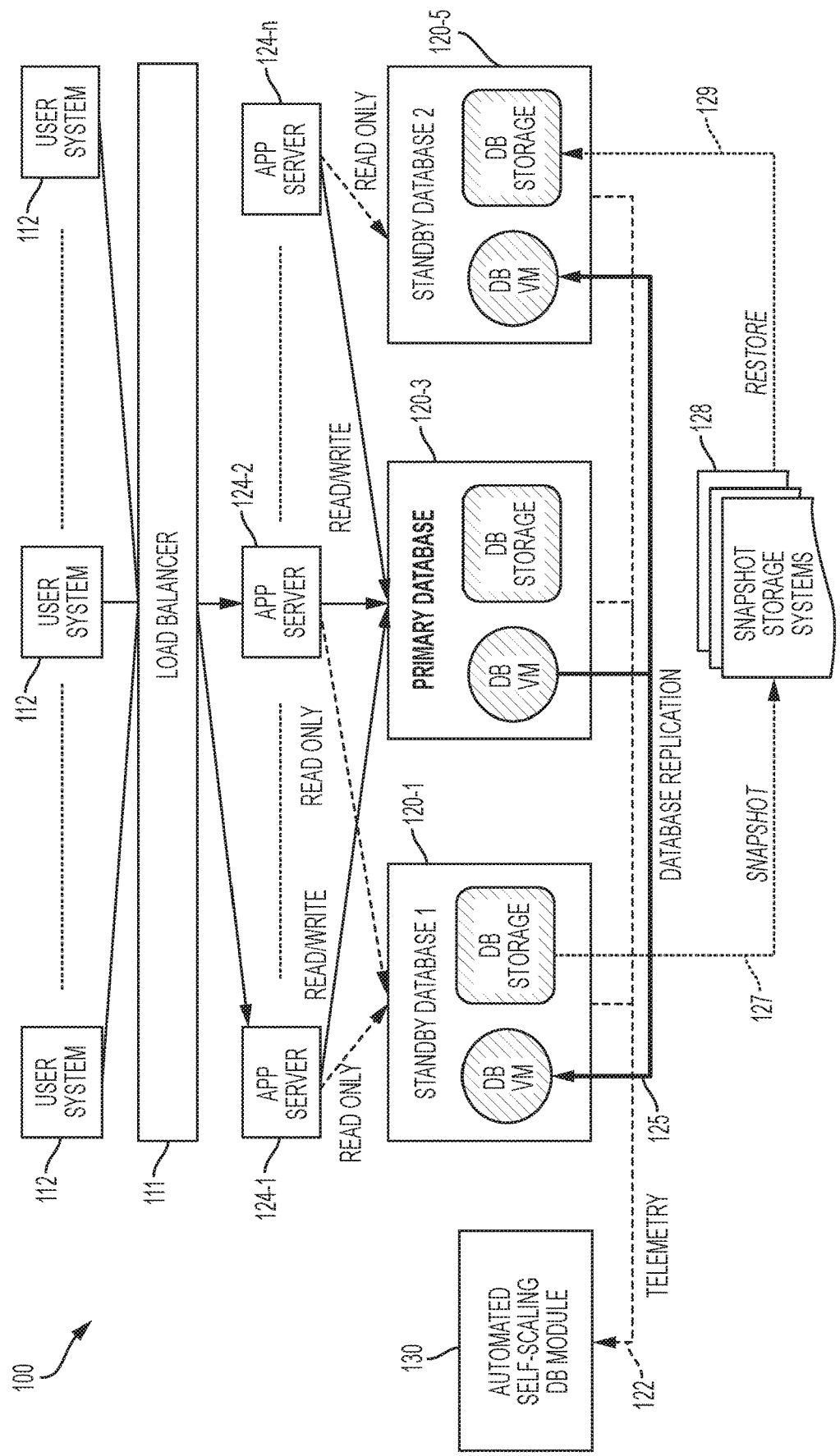

FIG. 5 is a flow chart that illustrates another exemplary method for providing an automated self-scaling database system with automated read scale out in accordance with the disclosed embodiments. FIG. 5 will be described with reference to FIGS. 6A-6B. FIGS. 6A-6B are block diagrams that illustrate an automated self-scaling database system of FIG. 1 and how it functions to achieve automatic read upscaling capability in accordance with the disclosed embodiments. This allows read operations in the database system to be automatically scaled out.

At step 505 of FIG. 5, the automated self-scaling database module 130 receives the telemetry information from the primary database 120-3 and the standby database 120-1 on a regular basis (e.g., periodically or in response to some trigger event or condition that occurs), and the database capacity monitoring sub-module 232 of the automated self-scaling database module 130 can monitor and analyze the telemetry information to project or predict whether there is the need for upscaling the storage capacity and computation resources of the database system for read operations at 507.

When the database capacity monitoring sub-module 232 of the automated self-scaling database module 130 determines (at 507), based on the telemetry information that upscaling is needed, the method 300 proceeds to 510.

Before the snapshot application and management sub-module 234 of the automated self-scaling database module 130 takes a snapshot, the standby database provisioning sub-module 240 of the automated self-scaling database module 130 can first temporarily suspend (e.g., pause or quiesce) the replication 125 (step 510 of FIG. 5) from applying changes/transaction to the standby database 120-1. The snapshot application and management sub-module 234 of the automated self-scaling database module 130 can then take a snapshot, and the standby database provisioning sub-module 240 of the automated self-scaling database module 130 can then resume the replication after the snapshot is taken.

As shown in FIG. 6A, at step 520 of FIG. 5, snapshot application and management sub-module 234 to take a crash-consistent snapshot 127 of the standby database 120-1 and store the snapshot at the snapshot storage system 128. The snapshot storage system 128 can be implemented using separate storage hardware that is not implemented at any of the databases 120. A snapshot application and management module (not illustrated) executes to regularly or periodically to capture snapshots of data stored at the standby database 120-1, and stores the snapshots of data at a snapshot storage system 128. The snapshot storage systems 128 can be accessed such that the snapshot data is available almost instantaneously. The snapshot data can be used for data restore or for provisioning other standby databases.

After taking the snapshot 127, at step 530 of FIG. 5, the standby database provisioning sub-module 240 restores the replication 125 to the standby database 120-1.

As shown in FIG. 6B, at 540, the standby database provisioning sub-module 240 of the automated self-scaling database module 130 can automatically initiate the upscaling (or scaling out read operations) by provisioning one or more new standby databases 120-5 and off-loading read requests to the new standby database(s). To do so, at 560, the virtual machine provisioning, migration, and management sub-module 233 can provision a new virtual machine (VM) for the new standby database 120-5 having upscaled computation resources for database computations, and at 570, the storage throughput provisioning and management sub-module 237 can provision new DB storage for the new standby database 120-5 having upscaled storage capacity for throughput and space capacity. This new standby database 120-5 will eventually become an additional standby database 120-5. In one embodiment, the standby database 120-5 can have the same computation resources and storage capacity in comparison to the standby database 120-1. In another embodiment, the standby database 120-5 can have increased or scaled-up computation resources and storage capacity in comparison to the standby database 120-1 (i.e., assuming that the standby database 120-1 is not at its maximum allowable computation resources and storage capacity). For example, the virtual machine provisioning, migration, and management sub-module 233 of the automated self-scaling database module 130 can scale up to the largest virtual machine that the cloud environment provides. The storage throughput provisioning and management sub-module 237 of the automated self-scaling database module 130 can also increase the storage throughput or increase the space size of database (DB) storage using the Application Programming Interface (API) provided by the cloud environment up to the limit imposed by the cloud environment.

At 580, the snapshot application and management sub-module 234 restores the snapshot 127 that was taken (using the most recent snapshot data that is stored at snapshot storage systems) to the new DB storage of the newly provisioned standby database 120-5, and the standby database provisioning sub-module 240 starts the new virtual machine (VM) for the new standby database 120-5, assigns the standby role to the new standby database 120-5 in the database replication configuration (Data Guard), and starts the database replication 123 from the primary database 120-3 to the new standby database 120-5.

After the newly provisioned standby database 120-5 is ready, at step 590, the read-only application mode sub-module 236 of the automated self-scaling database module 130 will notify the application servers 124 to start off-loading read-only requests to the new standby database 120-5 (standby database 2). The method of FIG. 5 can be repeated for adding more standby databases (not illustrated in FIG. 7) for the read scaling until the database replication limitation is reached.

Automated Write Scale Out

Based on the telemetry information, the automated self-scaling database module 130 can determine that further scaling for the write operation is necessary after the primary database 120-1 has reached the maximum computation and storage capacity supported by the cloud environment.

Figure 7A:
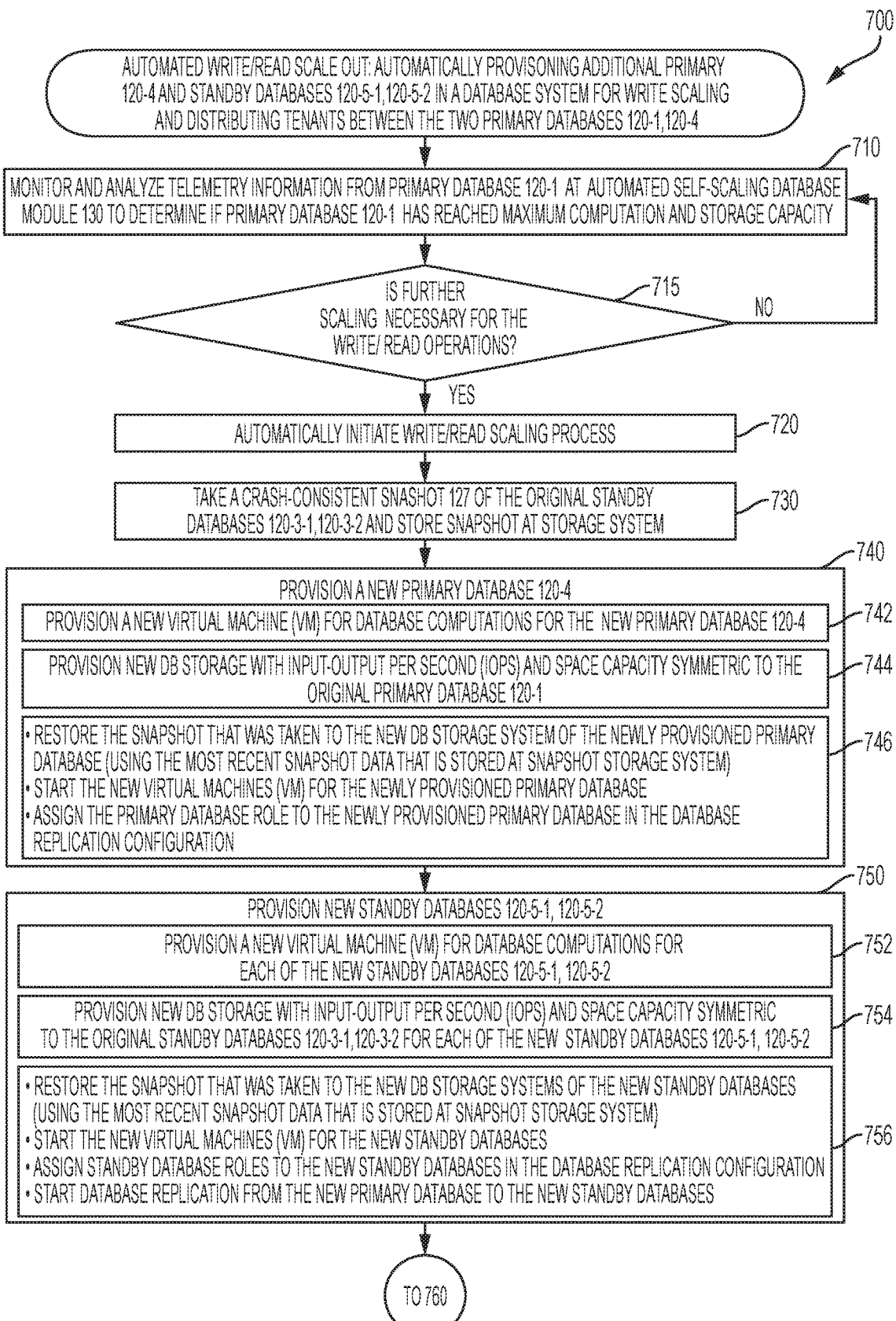
FIGS. 7A and 7B are collectively a flow chart that illustrates another exemplary method for providing an automated self-scaling database system with automated write scale out in accordance with the disclosed embodiments.
Figure 7B:
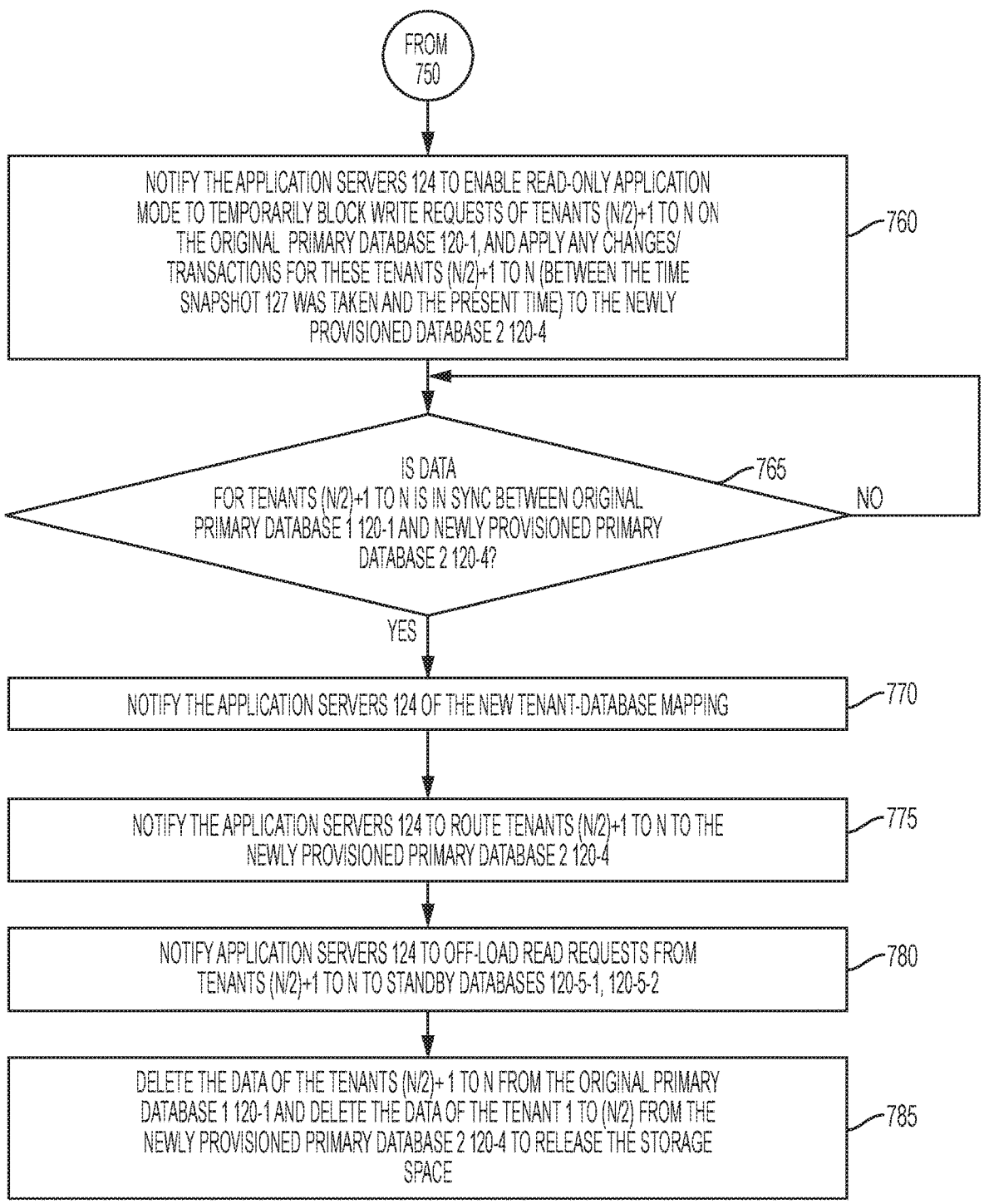
Figure 8A:
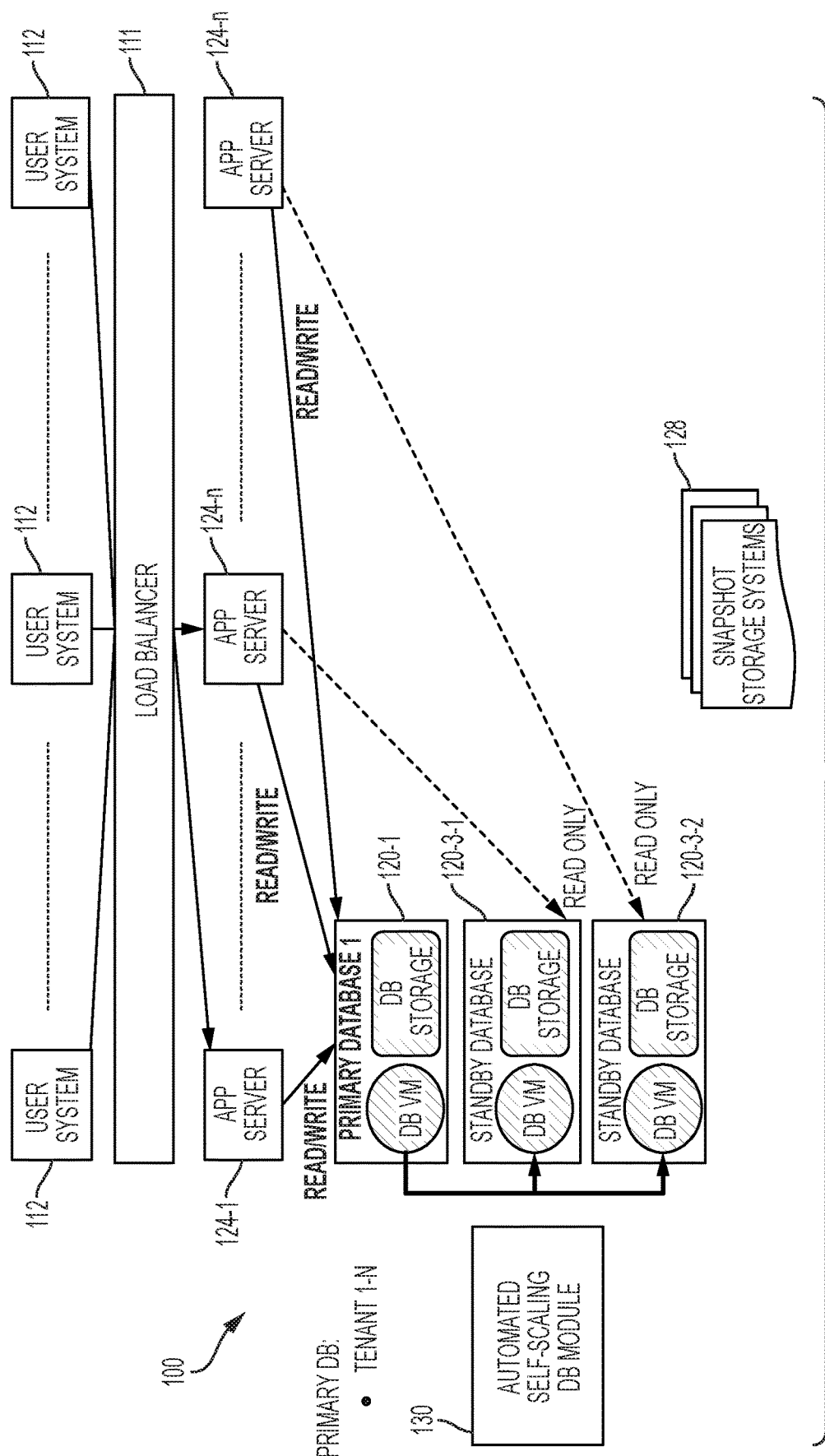
FIGS. 8A-8C are block diagrams that illustrate an automated self-scaling database system and how it functions to achieve automatic upscaling capability with automated write scale out in accordance with the disclosed embodiments.
Figure 8B:
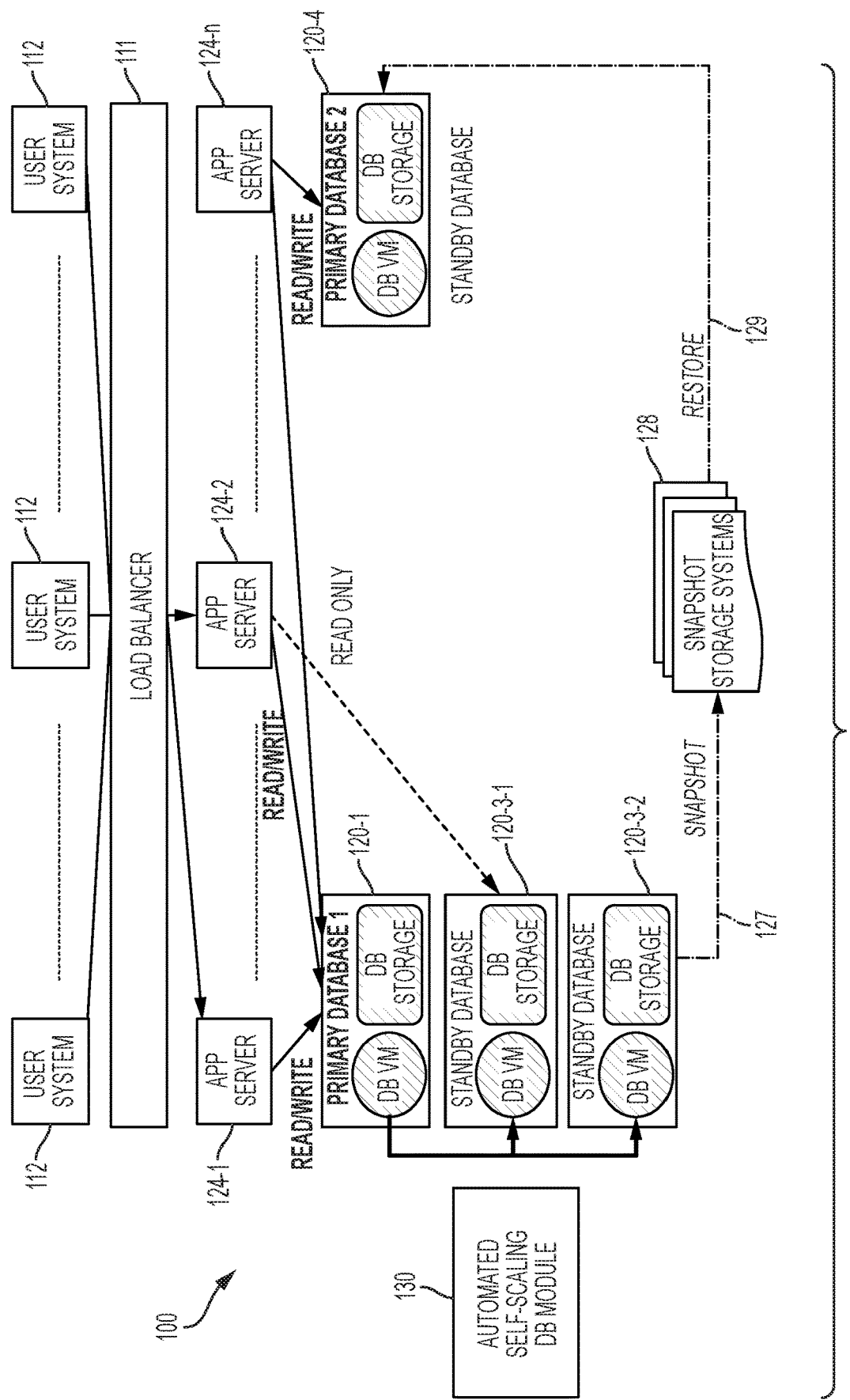
Figure 8C:
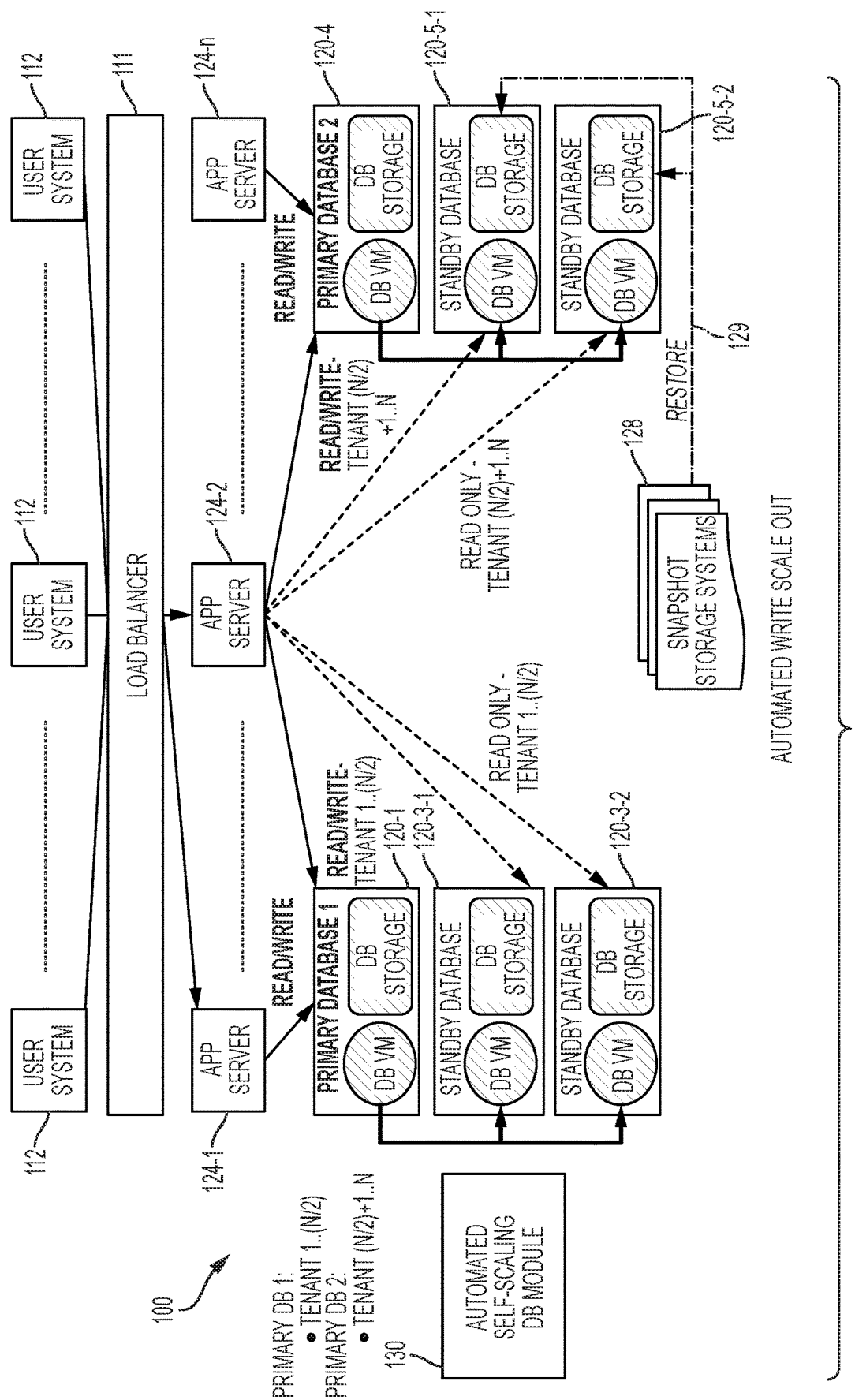

FIGS. 7A and 7B are collectively a flow chart that illustrates another exemplary method for providing an automated self-scaling database system with automated write scale out in accordance with the disclosed embodiments. FIGS. 7A and 7B will be described with reference to FIGS. 8A-8C. FIGS. 8A-8C are block diagrams that illustrate an automated self-scaling database system of FIG. 1 and how it functions to achieve automatic upscaling capability with automated write scale out in accordance with the disclosed embodiments As will be described below, the automated self-scaling database module 130 can automatically provision a new primary database 120-4 and distribute the tenants between the two primary databases 120-1, 120-4. In FIG. 8A, the primary database 120-1 hosts tenants 1-N and has two standby databases 120-3-1, 120-3-2 for the read scaling.

At step 710 of FIG. 7A, the automated self-scaling database module 130 receives the telemetry information from the primary database 120-1 and the standby databases 120-3-1, 120-3-2 on a regular basis (e.g., periodically or in response to some trigger event or condition that occurs), and the database capacity monitoring sub-module 232 of the automated self-scaling database module 130 can monitor and analyze the telemetry information to project or predict whether there is the need for upscaling the storage capacity and computation resources of the database system for write operations at 715. For example, the database capacity monitoring sub-module 232 can regularly determine whether the write capacity of the primary database 120-1 is at the maximum computation and storage capacity supported by the primary database 120-1. When the database capacity monitoring sub-module 232 of the automated self-scaling database module 130 determines (at 715), based on the telemetry information that write scaling is needed, the method 700 proceeds to 720, where the database capacity monitoring sub-module 232 automatically initiates a write scaling process and optionally a read scaling process.

As shown in FIG. 8B, step 730 of FIG. 7A, the snapshot application and management sub-module 234 of the automated self-scaling database module 130 takes the snapshot 127 of one of the standby databases 120-3-1 or 120-3-2. The method 700 then proceeds to step 740, where the automated self-scaling database module 130 then provisions a new, additional primary database 120-4 (primary database 2) for write scaling, and then proceeds to 750, where the automated self-scaling database module 130 then provisions new additional standby databases 120-5-1, 120-5-2 for primary database 2 120-4 for the read scaling.

In one embodiment, at 742, the virtual machine provisioning, migration, and management sub-module 233 of the automated self-scaling database module 130 then provisions a new virtual machine for the new primary database 120-4 (as show in FIG. 8B). At 744, the storage throughput provisioning and management sub-module 237 can provision new DB storage for the new primary database 120-4 (as show in FIG. 8B). As will be explained below, the new primary database 120-4 will eventually become responsible for handling read/write requests that are received by the application servers 124 for some of the tenants (N/2)+1 to N (e.g., a second group of tenants), while the old primary database 120-1 will eventually become responsible for handling read/write requests that are received by the application servers 124 for other tenants 1 to (N/2) (e.g., for a first group of tenants).

The method 700 then proceeds to step 746, where the snapshot application and management sub-module 234 then restores 129 the snapshot 127 that was taken (using the most recent snapshot data that is stored at snapshot storage system 128) to the new DB storage systems of the newly provisioned primary database 120-4 (as shown in FIG. 8B). In addition, the virtual machine provisioning, migration, and management sub-module 233 starts the new virtual machines (VM) for the newly provisioned primary database 120-4. The standby database provisioning sub-module 240 assigns the initial role to a newly provisioned database. The standby database provisioning sub-module 240 may assign the standby database role (in most cases) or the primary database role to the newly provisioned primary database 120-4 in the database replication configuration (e.g., Data Guard). If the standby database provisioning sub-module 240 assigns a "standby" role to a newly provisioned database, it will then establish the replication between the associated primary database and this new standby database. The subsequent role transitions are then managed by database switchover automation sub-module 235. By contrast, if the standby database provisioning sub-module 240 assigns a primary role to a newly provisioned database, it means this new database is a new/independent database and no further replication needs to be established. The new primary database does not need to sync with the first primary database after the snapshot restore. The changes for only the $2^{nd}$ group of tenants will be captured from the primary database 1 and applied to the newly provisioned primary database 120-4.

In one embodiment, at 752, the virtual machine provisioning, migration, and management sub-module 233 of the automated self-scaling database module 130 then provisions new virtual machines for each of the new standby databases 120-5-1, 120-5-2 (as shown in FIG. 8C). At 754, the storage throughput provisioning and management sub-module 237 can provision new DB storage for each of the new standby databases 120-5-1, 120-5-2 (as also shown in FIG. 8C). As will be explained below, the new standby databases 120-5-1, 120-5-2 will eventually become responsible for handling read-only requests that are received by the application servers 124 for some of the tenants (N/2)+1 to N (e.g., a second group of tenants), while the old standby databases 120-3-1, 120-3-2 will eventually become responsible for handling read-only requests that are received by the application servers 124 for other tenants 1 to (N/2) (e.g., for a first group of tenants).

The method 700 then proceeds to step 756, where the snapshot application and management sub-module 234 then restores 129 the snapshot 127 that was taken (using the most recent snapshot data that is stored at snapshot storage system 128) to the new DB storage systems of the new standby databases 120-5-1, 120-5-2 (as shown in FIG. 8C). In addition, the virtual machine provisioning, migration, and management sub-module 233 starts the new virtual machines (VM) for the new standby databases 120-5-1, 120-5-2. The standby database provisioning sub-module 240 assigns the initial database roles at the time of provisioning. In this case it is the standby database roles to the new standby databases 120-5-1, 120-5-2 in the database replication configuration (e.g., Data Guard), and the standby database provisioning sub-module 240 starts the database replication 123 from the new primary database 120-4 to the new standby databases 120-5-1, 120-5-2.

After the new primary database 120-4 is ready, at 760, the tenant workload distribution sub-module 239 of the automated self-scaling database module 130 notifies the application servers 124 to enable read-only application mode to temporarily block the write requests of some tenants on the original primary database 120-1. This will indicate to the application servers 124 that they are to temporarily block some tenants and apply any changes for these tenants (between the time snapshot 127 was taken and the present time) to the new primary database 2 120-4 using a data change capture and apply service 238 of FIG. 2. For instance, in one non-limiting embodiment, in response to instructions from read-only application mode sub-module 236, the application servers 124 can enable read-only application mode for tenants (N/2)+1 to N on primary database 1 120-1 and apply transactions for these tenants between the time snapshot 127 was taken and this moment to the newly provisioned primary database 2 120-4. This can be done in a smaller batched fashion for a smaller group of tenants to reduce the overall service disruptions.

At 765, the change data capture and apply sub-module 238 of the automated self-scaling database module 130 can regularly determine whether the data for the tenants (N/2)+1 to N is in sync between original primary database 1 120-1 and the newly provisioned primary database 2 120-4. As shown in FIG. 8C, after the data for the tenants (N/2)+1 to N is in sync between primary database 1 120-1 and primary database 2 120-4, the tenant workload distribution sub-module 239 of the automated self-scaling database module 130 can notify the application servers 124 of the new tenant-database mapping (at step 770 of FIG. 7B). At 775, the tenant workload distribution sub-module 239 of the automated self-scaling database module 130 can notify the application servers 124 to route read/write requests from tenants (N/2)+1 to N to the newly provisioned primary database 2 120-4.

At step 780, the tenant workload distribution sub-module 239 notifies the application servers 124 to start off-loading read-only requests from the second group of the tenants (N/2)+1 to N to the newly provisioned standby databases 120-5-1, 120-5-2.

After the standby databases 120-5-1, 120-5-2 are ready, at 785, the tenant workload distribution sub-module 239 of the automated self-scaling database module 130 then deletes the data of the tenants (N/2)+1 to N from the primary database 1 120-1 and deletes the data of the tenant 1 to (N/2) from the new primary database 2 120-4 to release storage space at the first primary database 120-1 and to release storage space at the new primary database 120-4.

Steps 760-785 are non-limiting, and provided to illustrate the concept of automatically provisioning a new primary database one possible method for distributing tenants for write scaling. In other words, this is simply one non-limiting example of how the automated self-scaling database module 130 can distribute the tenants for write scaling. However, it should be appreciated that the automated self-scaling database module 130 may use other algorithms to determine how to distribute the tenants for write scaling. For instance, in another embodiment, the automated self-scaling database module 130 can distribute the tenants for write scaling based on the workload of the tenants (instead of dividing the number of tenants equally as described in the above example).

The following description is of one example of a system in which the features described above may be implemented. The components of the system described below are merely one example and should not be construed as limiting. The features described above with respect to FIGS. 1-8C may be implemented in other types of computing environments, such as one with multiple databases, a multi-tenant database system environment, a single-tenant database system environment, or some combination of the above.

Figure 9:
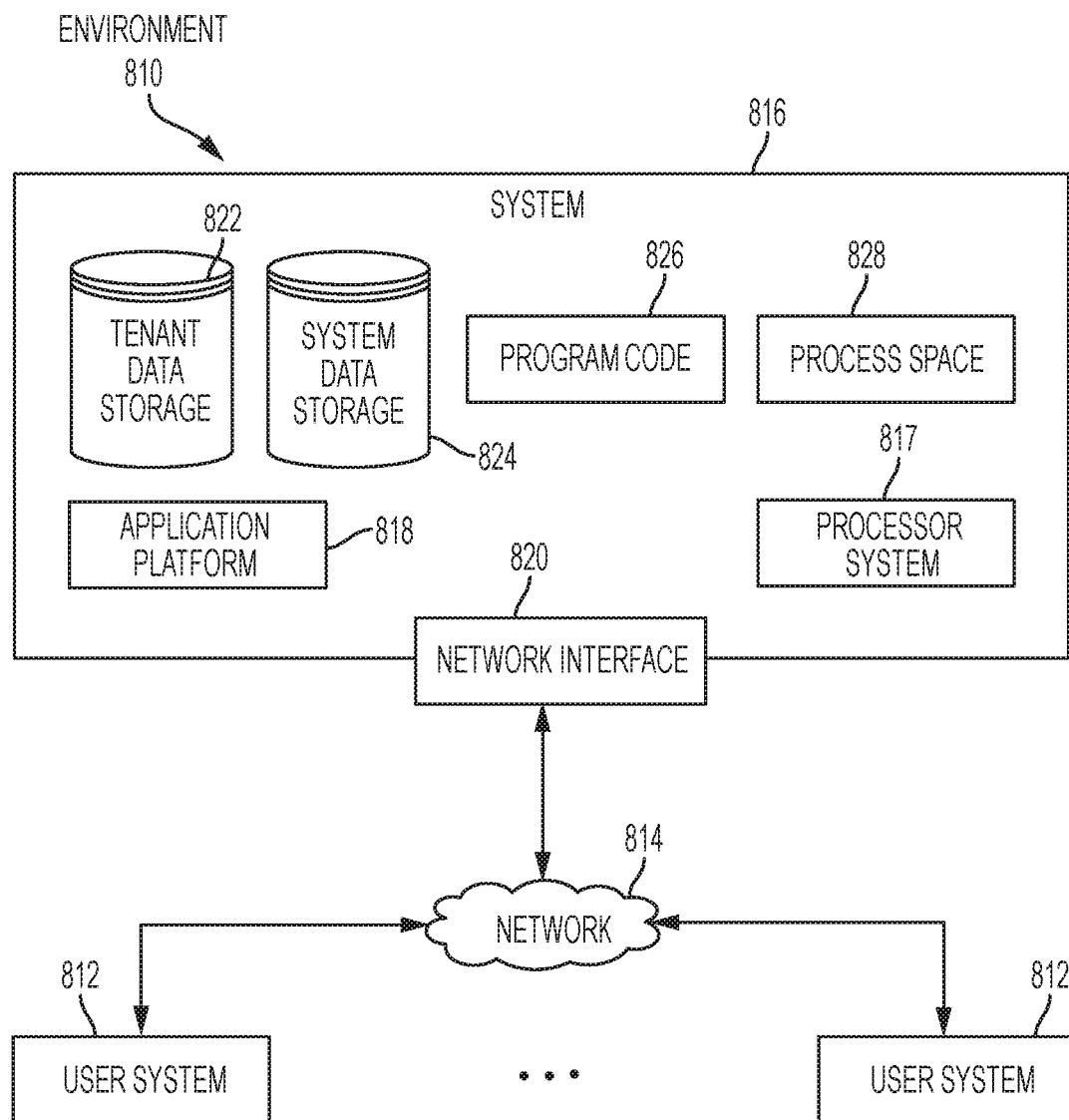
FIG. 9 shows a block diagram of an example of an environment in which an on-demand database service can be used in accordance with some implementations.

FIG. 9 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline back-ups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 10:
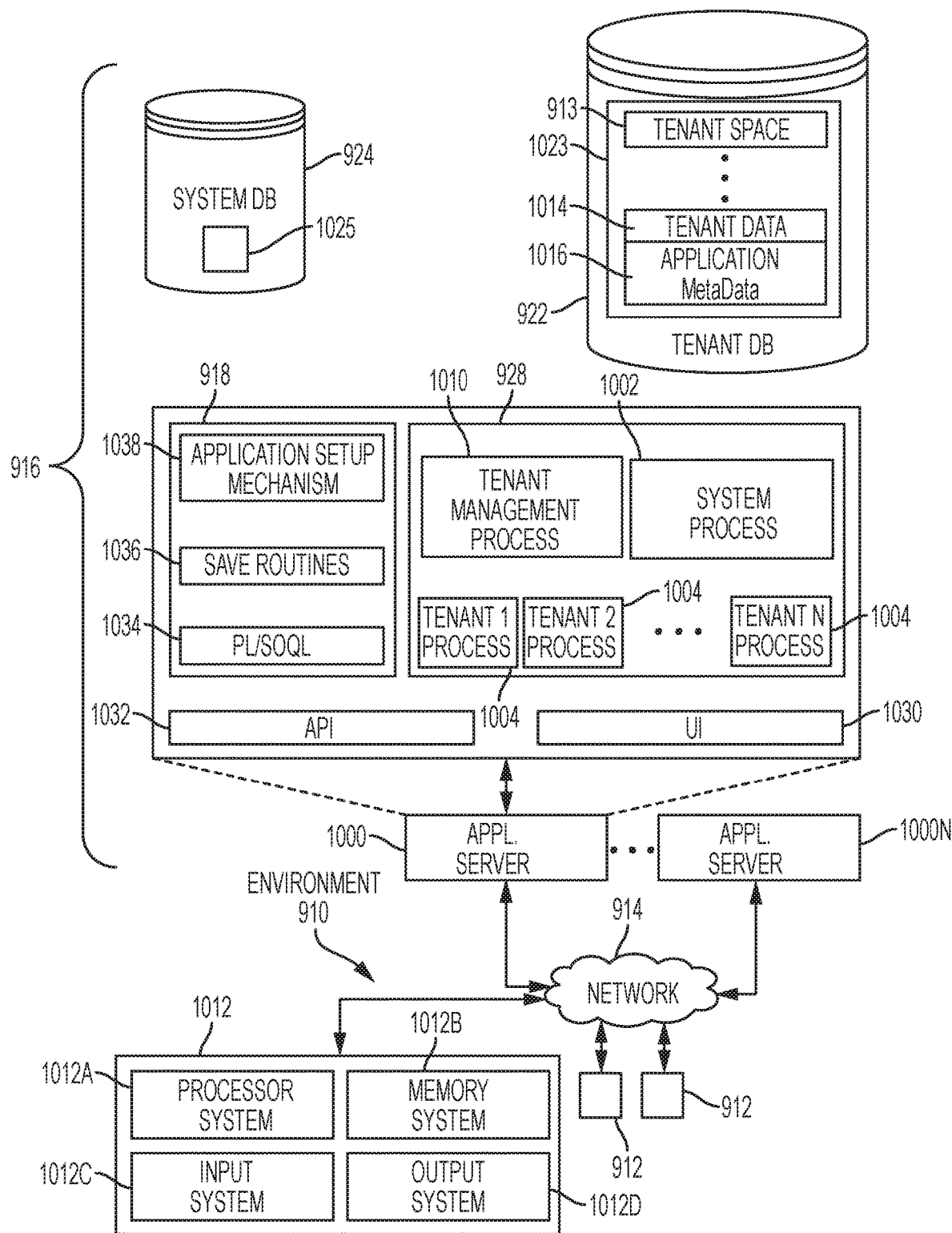
FIG. 10 shows a block diagram of example implementations of elements of FIG. 9 and example interconnections between these elements according to some implementations.

FIG. 10 shows a block diagram of example implementations of elements of FIG. 9 and example interconnections between these elements according to some implementations. That is, FIG. 10 also illustrates environment 910, but in FIG. 10, various elements of the system 916 and various interconnections between such elements are shown with more specificity according to some more specific implementations. Elements from FIG. 9 that are also shown in FIG. 10 will use the same reference numbers in FIG. 10 as were used in FIG. 9. Additionally, in FIG. 10, the user system 1012 or 912 includes a processor system 1012A, a memory system 1012B, an input system 1012C, and an output system 1012D. The processor system 1012A can include any suitable combination of one or more processors. The memory system 1012B can include any suitable combination of one or more memory devices. The input system 1012C can include any suitable combination of input devices, such as one or more touchscreen interfaces, keyboards, mice, trackballs, scanners, cameras, or interfaces to networks. The output system 1012D can include any suitable combination of output devices, such as one or more display devices, printers, or interfaces to networks.

In FIG. 10, the network interface 920 of FIG. 9 is implemented as a set of HTTP application servers $1000_1$-$1000_N$. Each application server 1000, also referred to herein as an "app server," is configured to communicate with tenant database 922 and the tenant data 1023 therein, as well as system database 924 and the system data 1025 therein, to serve requests received from the user systems 1012. The tenant data 1023 can be divided into individual tenant storage spaces 1013, which can be physically or logically arranged or divided. Within each tenant storage space 1013, tenant data 1014 and application metadata 1016 can similarly be allocated for each user. For example, a copy of a user's most recently used (MRU) items can be stored to user storage 1014. Similarly, a copy of MRU items for an entire organization that is a tenant can be stored to tenant storage space 1013.

The process space 928 includes system process space 1002, individual tenant process spaces 1004 and a tenant management process space 1010. The application platform 918 includes an application setup mechanism 1038 that supports application developers' creation and management of applications. Such applications and others can be saved as metadata into tenant database 922 by save routines 1036 for execution by subscribers as one or more tenant process spaces 1004 managed by tenant management process 1010, for example. Invocations to such applications can be coded using PL/SOQL 1034, which provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 916 for the subscriber making the invocation and executing the metadata as an application in a virtual machine.

The system 916 of FIG. 10 also includes a user interface (UI) 1030 and an application programming interface (API) 1032 to system 916 resident processes to users or developers at user systems 1012. In some other implementations, the environment 910 may not have the same elements as those listed above or may have other elements instead of, or in addition to, those listed above.

Each application server 1000 can be communicably coupled with tenant database 922 and system database 924, for example, having access to tenant data 1023 and system data 1025, respectively, via a different network connection. For example, one application server $1000_1$ can be coupled via the network 914 (for example, the Internet), another application server $1000_N$ can be coupled via a direct network link, and another application server (not illustrated) can be coupled by yet a different network connection. Transfer Control Protocol and Internet Protocol (TCP/IP) are examples of typical protocols that can be used for communicating between application servers 1000 and the system 916. However, it will be apparent to one skilled in the art that other transport protocols can be used to optimize the system 916 depending on the network interconnections used.

In some implementations, each application server 1000 is configured to handle requests for any user associated with any organization that is a tenant of the system 916. Because it can be desirable to be able to add and remove application servers 1000 from the server pool at any time and for various reasons, in some implementations there is no server affinity for a user or organization to a specific application server 1000. In some such implementations, an interface system implementing a load balancing function (for example, an F5 Big-IP load balancer) is communicably coupled between the application servers 1000 and the user systems 1012 to distribute requests to the application servers 1000. In one implementation, the load balancer uses a least-connections algorithm to route user requests to the application servers 1000. Other examples of load balancing algorithms, such as round robin and observed-response-time, also can be used. For example, in some instances, three consecutive requests from the same user could hit three different application servers 1000, and three requests from different users could hit the same application server 1000. In this manner, by way of example, system 916 can be a multi-tenant system in which system 916 handles storage of, and access to, different objects, data and applications across disparate users and organizations.

In one example storage use case, one tenant can be a company that employs a sales force where each salesperson uses system 916 to manage aspects of their sales. A user can maintain contact data, leads data, customer follow-up data, performance data, goals and progress data, etc., all applicable to that user's personal sales process (for example, in tenant database 922). In an example of a MTS arrangement, because all of the data and the applications to access, view, modify, report, transmit, calculate, etc., can be maintained and accessed by a user system 1012 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 916 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 916 also can maintain system level data usable by multiple tenants or other data. Such system level data can include industry reports, news, postings, and the like that are sharable among tenants.

In some implementations, the user systems 1012 (which also can be client systems) communicate with the application servers 1000 to request and update system-level and tenant-level data from the system 916. Such requests and updates can involve sending one or more queries to tenant database 922 or system database 924. The system 916 (for example, an application server 1000 in the system 916) can automatically generate one or more SQL statements (for example, one or more SQL queries) designed to access the desired information. System database 924 can generate query plans to access the requested data from the database.

The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 11A:
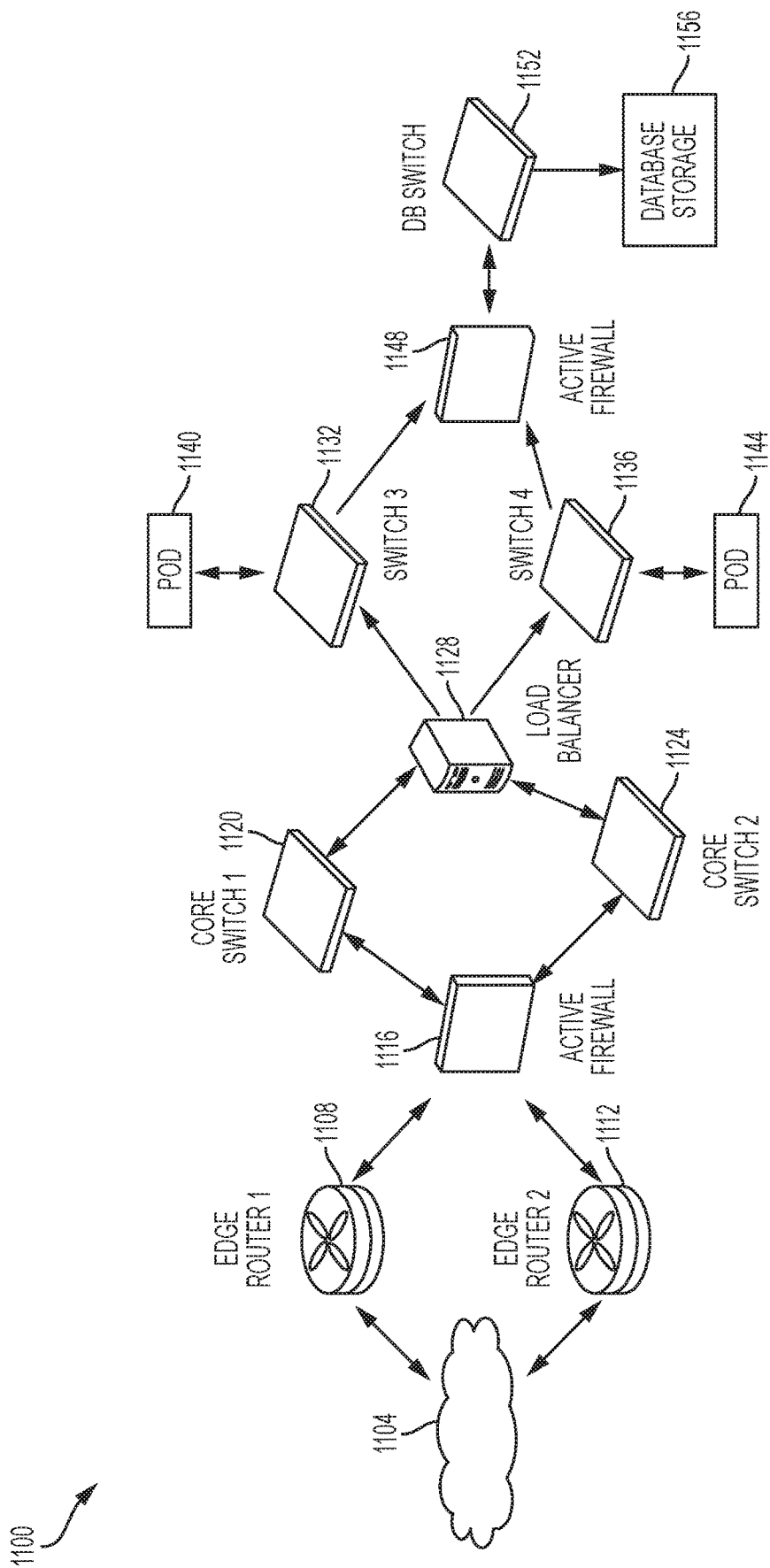
FIG. 11A shows a system diagram illustrating example architectural components of an on-demand database service environment according to some implementations.

FIG. 11A shows a system diagram illustrating example architectural components of an on-demand database service environment 1100 according to some implementations. A client machine communicably connected with the cloud 1104, generally referring to one or more networks in combination, as described herein, can communicate with the on-demand database service environment 1100 via one or more edge routers 1108 and 1112. A client machine can be any of the examples of user systems 12 described above. The edge routers can communicate with one or more core switches 1120 and 1124 through a firewall 1116. The core switches can communicate with a load balancer 1128, which can distribute server load over different pods, such as the pods 1140 and 1144. The pods 1140 and 1144, which can each include one or more servers or other computing resources, can perform data processing and other operations used to provide on-demand services. Communication with the pods can be conducted via pod switches 1132 and 1136. Components of the on-demand database service environment can communicate with database storage 1156 through a database firewall 1148 and a database switch 1152.

Figure 11B:
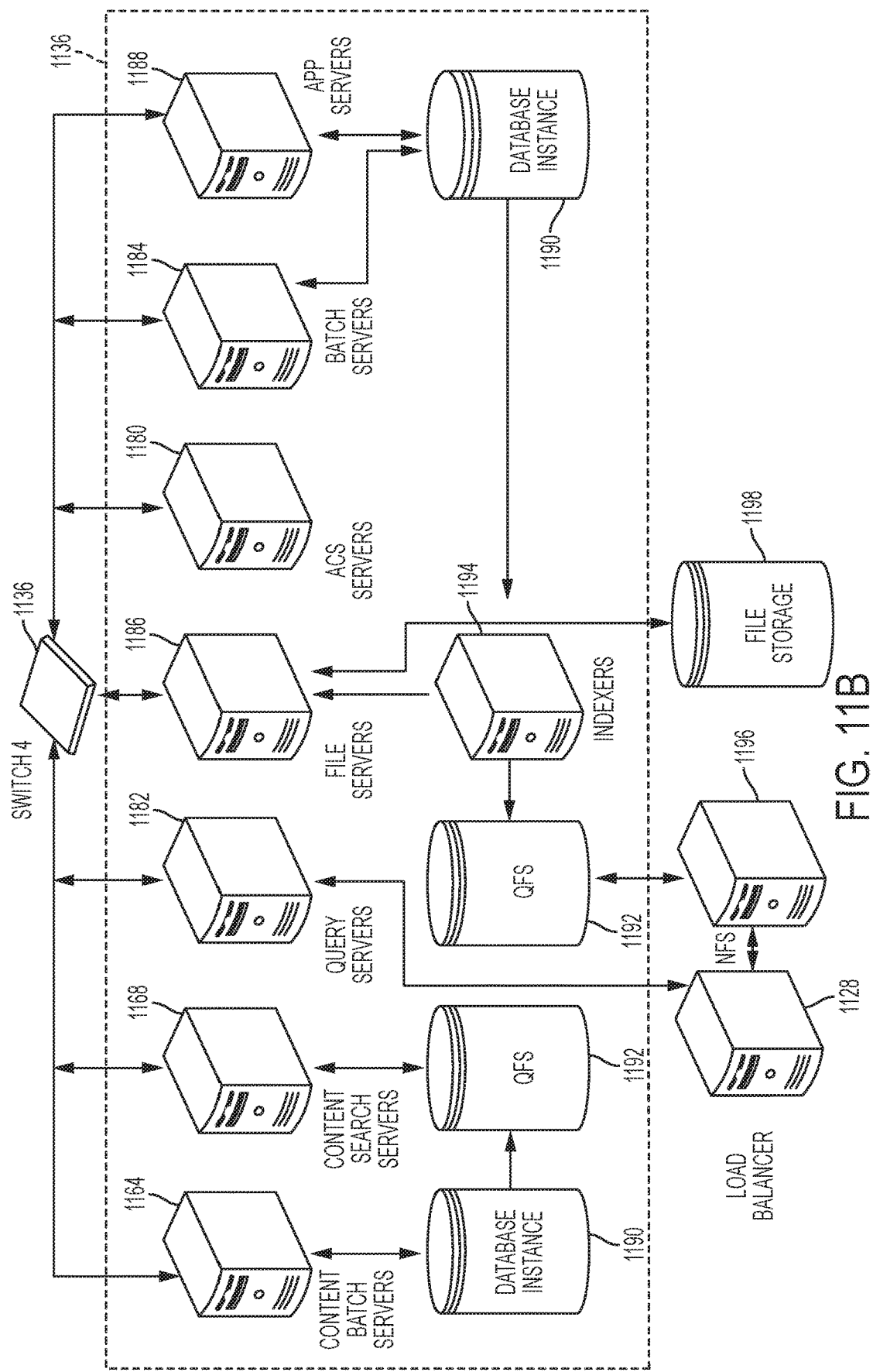
FIG. 11B shows a system diagram further illustrating example architectural components of an on-demand database service environment according to some implementations.

As shown in FIGS. 11A and 11B, accessing an on-demand database service environment can involve communications transmitted among a variety of different hardware or software components. Further, the on-demand database service environment 1100 is a simplified representation of an actual on-demand database service environment. For example, while only one or two devices of each type are shown in FIGS. 11A and 11B, some implementations of an on-demand database service environment can include anywhere from one to several devices of each type. Also, the on-demand database service environment need not include each device shown in FIGS. 11A and 11B, or can include additional devices not shown in FIGS. 11A and 11B.

Additionally, it should be appreciated that one or more of the devices in the on-demand database service environment 1100 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1104 is intended to refer to a data network or multiple data networks, often including the Internet. Client machines communicably connected with the cloud 1104 can communicate with other components of the on-demand database service environment 1100 to access services provided by the on-demand database service environment. For example, client machines can access the on-demand database service environment to retrieve, store, edit, or process information. In some implementations, the edge routers 1108 and 1112 route packets between the cloud 1104 and other components of the on-demand database service environment 1100. For example, the edge routers 1108 and 1112 can employ the Border Gateway Protocol (BGP). The BGP is the core routing protocol of the Internet. The edge routers 1108 and 1112 can maintain a table of IP networks or 'prefixes', which designate network reachability among autonomous systems on the Internet.

In some implementations, the firewall 1116 can protect the inner components of the on-demand database service environment 1100 from Internet traffic. The firewall 1116 can block, permit, or deny access to the inner components of the on-demand database service environment 1100 based upon a set of rules and other criteria. The firewall 1116 can act as one or more of a packet filter, an application gateway, a stateful filter, a proxy server, or any other type of firewall.

In some implementations, the core switches 1120 and 1124 are high-capacity switches that transfer packets within the on-demand database service environment 1100. The core switches 1120 and 1124 can be configured as network bridges that quickly route data between different components within the on-demand database service environment. In some implementations, the use of two or more core switches 1120 and 1124 can provide redundancy or reduced latency.

In some implementations, the pods 1140 and 1144 perform the core data processing and service functions provided by the on-demand database service environment. Each pod can include various types of hardware or software computing resources. An example of the pod architecture is discussed in greater detail with reference to FIG. 11B. In some implementations, communication between the pods 1140 and 1144 is conducted via the pod switches 1132 and 1136. The pod switches 1132 and 1136 can facilitate communication between the pods 1140 and 1144 and client machines communicably connected with the cloud 1104, for example via core switches 1120 and 1124. Also, the pod switches 1132 and 1136 may facilitate communication between the pods 1140 and 1144 and the database storage 1156. In some implementations, the load balancer 1128 can distribute workload between the pods 1140 and 1144. Balancing the on-demand service requests between the pods can assist in improving the use of resources, increasing throughput, reducing response times, or reducing overhead. The load balancer 1128 may include multilayer switches to analyze and forward traffic.

In some implementations, access to the database storage 1156 is guarded by a database firewall 1148. The database firewall 1148 can act as a computer application firewall operating at the database application layer of a protocol stack. The database firewall 1148 can protect the database storage 1156 from application attacks such as structure query language (SQL) injection, database rootkits, and unauthorized information disclosure. In some implementations, the database firewall 1148 includes a host using one or more forms of reverse proxy services to proxy traffic before passing it to a gateway router. The database firewall 1148 can inspect the contents of database traffic and block certain content or database requests. The database firewall 1148 can work on the SQL application level atop the TCP/IP stack, managing applications' connection to the database or SQL management interfaces as well as intercepting and enforcing packets traveling to or from a database network or application interface.

In some implementations, communication with the database storage 1156 is conducted via the database switch 1152. The multi-tenant database storage 1156 can include more than one hardware or software components for handling database queries. Accordingly, the database switch 1152 can direct database queries transmitted by other components of the on-demand database service environment (for example, the pods 1140 and 1144) to the correct components within the database storage 1156. In some implementations, the database storage 1156 is an on-demand database system shared by many different organizations as described above with reference to FIG. 10 and FIG. 10.

FIG. 11B shows a system diagram further illustrating example architectural components of an on-demand database service environment according to some implementations. The pod 1144 can be used to render services to a user of the on-demand database service environment 1100. In some implementations, each pod includes a variety of servers or other systems. The pod 1144 includes one or more content batch servers 1164, content search servers 1168, query servers 1182, file force servers 1186, access control system (ACS) servers 1180, batch servers 1184, and app servers 1188. The pod 1144 also can include database instances 1190, quick file systems (QFS) 1192, and indexers 1194. In some implementations, some or all communication between the servers in the pod 1144 can be transmitted via the switch 1136.

In some implementations, the app servers 1188 include a hardware or software framework dedicated to the execution of procedures (for example, programs, routines, scripts) for supporting the construction of applications provided by the on-demand database service environment 1100 via the pod 1144. In some implementations, the hardware or software framework of an app server 1188 is configured to execute operations of the services described herein, including performance of the blocks of various methods or processes described herein. In some alternative implementations, two or more app servers 1188 can be included and cooperate to perform such methods, or one or more other servers described herein can be configured to perform the disclosed methods.

The content batch servers 1164 can handle requests internal to the pod. Some such requests can be long-running or not tied to a particular customer. For example, the content batch servers 1164 can handle requests related to log mining, cleanup work, and maintenance tasks. The content search servers 1168 can provide query and indexer functions. For example, the functions provided by the content search servers 1168 can allow users to search through content stored in the on-demand database service environment. The file force servers 1186 can manage requests for information stored in the File force storage 1198. The File force storage 1198 can store information such as documents, images, and basic large objects (BLOBs). By managing requests for information using the file force servers 1186, the image footprint on the database can be reduced. The query servers 1182 can be used to retrieve information from one or more file storage systems. For example, the query system 1182 can receive requests for information from the app servers 1188 and transmit information queries to the NFS 1196 located outside the pod.

The pod 1144 can share a database instance 1190 configured as a multi-tenant environment in which different organizations share access to the same database. Additionally, services rendered by the pod 1144 may call upon various hardware or software resources. In some implementations, the ACS servers 1180 control access to data, hardware resources, or software resources. In some implementations, the batch servers 1184 process batch jobs, which are used to run tasks at specified times. For example, the batch servers 1184 can transmit instructions to other servers, such as the app servers 1188, to trigger the batch jobs.

In some implementations, the QFS 1192 is an open source file storage system available from Sun Microsystems® of Santa Clara, Calif. The QFS can serve as a rapid-access file storage system for storing and accessing information available within the pod 1144. The QFS 1192 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1168 or indexers 1194 to identify, retrieve, move, or update data stored in the network file storage systems 1196 or other storage systems.

In some implementations, one or more query servers 1182 communicate with the NFS 1196 to retrieve or update information stored outside of the pod 1144. The NFS 1196 can allow servers located in the pod 1144 to access information to access files over a network in a manner similar to how local storage is accessed. In some implementations, queries from the query servers 1182 are transmitted to the NFS 1196 via the load balancer 1128, which can distribute resource requests over various resources available in the on-demand database service environment. The NFS 1196 also can communicate with the QFS 1192 to update the information stored on the NFS 1196 or to provide information to the QFS 1192 for use by servers located within the pod 1144.

In some implementations, the pod includes one or more database instances 1190. The database instance 1190 can transmit information to the QFS 1192. When information is transmitted to the QFS, it can be available for use by servers within the pod 1144 without using an additional database call. In some implementations, database information is transmitted to the indexer 1194. Indexer 1194 can provide an index of information available in the database 1190 or QFS 1192. The index information can be provided to file force servers 1186 or the QFS 1192.

Figure 12:
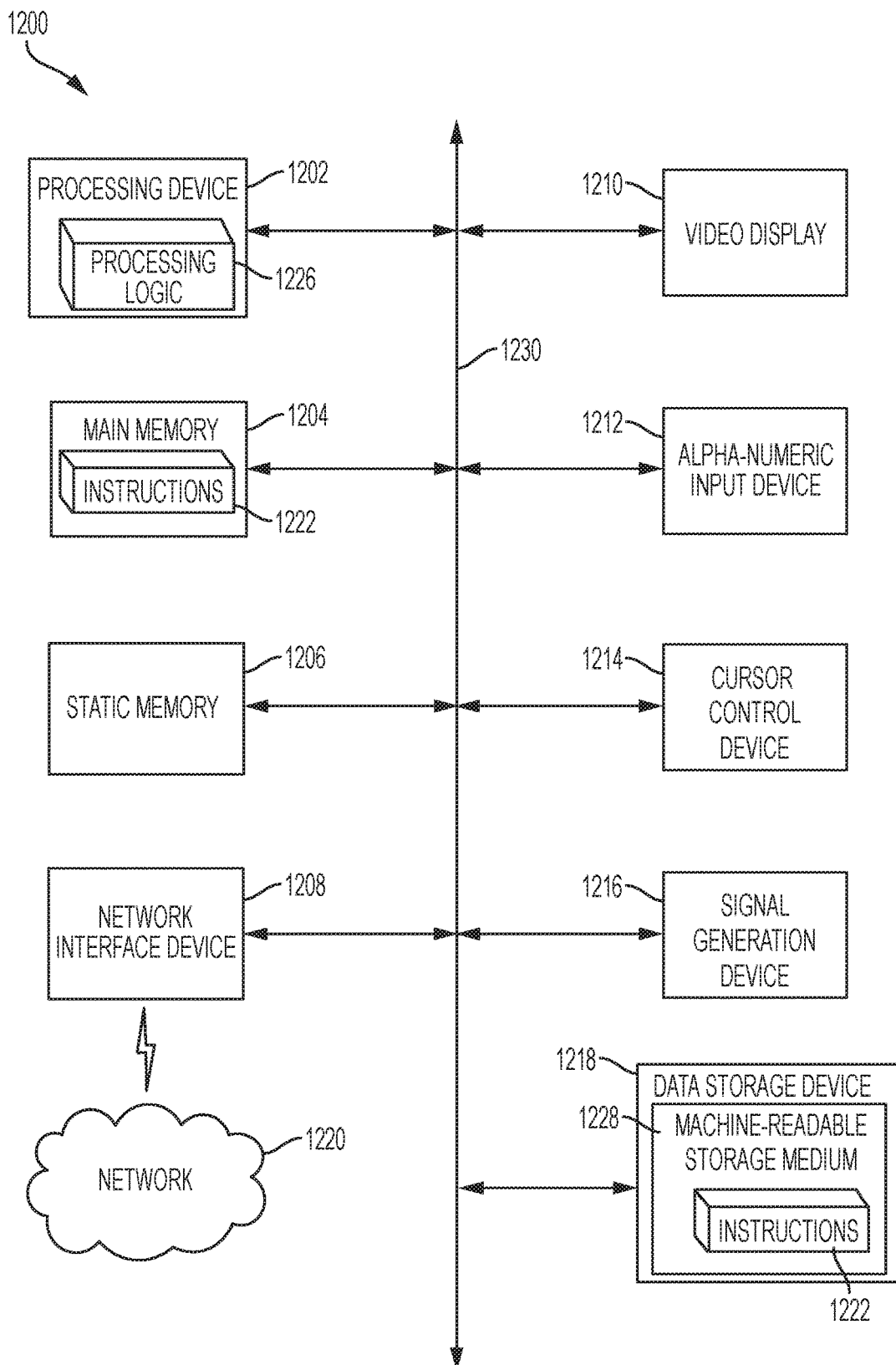
FIG. 12 illustrates a diagrammatic representation of a machine in the exemplary form of a computer system within which a set of instructions, for causing the machine to perform any one or more of the methodologies discussed herein, may be executed.

FIG. 12 illustrates a diagrammatic representation of a machine in the exemplary form of a computer system 1200 within which a set of instructions, for causing the machine to perform any one or more of the methodologies discussed herein, may be executed. The system 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable medium 1228 on which is stored one or more sets of instructions 1222 (e.g., instructions of in-memory buffer service 124) embodying any one or more of the methodologies or functions described herein. The instructions 1222 may also reside, completely or at least partially, within the main memory 1204 and/or within processing logic 1226 of the processing device 1202 during execution thereof by the computer system 1200, the main memory 1204 and the processing device 1202 also constituting computer-readable media. The instructions may further be transmitted or received over a network 1220 via the network interface device 1208.

While the computer-readable storage medium 1228 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "identifying," "adding," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for automatically scaling out read operations in an automated self-scaling database system that comprises an automated self-scaling database module, a primary database, a first standby database, the method comprising:
    starting a replication process between the primary database and the first standby database via the automated self-scaling database module;
    analyzing, at the automated self-scaling database module, telemetry information from the primary database and the first standby database to determine whether there is the need for upscaling storage capacity and computation resources of the database system for read operations;
    when the automated self-scaling database module determines that upscaling storage capacity and computation resources of the database system for read operations is needed:
    taking a snapshot of the first standby database via the automated self-scaling database module, wherein the snapshot is a complete copy of data stored in a storage system of the first standby database at a given time;
    storing the snapshot at a snapshot storage system;
    automatically initiating the upscaling, at the automated self-scaling database module, by provisioning a new standby database, wherein the provisioning comprises:
        automatically provisioning, via the automated self-scaling database module, a new virtual machine (VM) for the new standby database;
        starting the new virtual machine (VM) for the new standby database;
        automatically provisioning, via the automated self-scaling database module, a new storage system for the new standby database;
        assigning the new standby database a standby database role in the database system;
        restoring, via the automated self-scaling database module, the snapshot that was taken from the snapshot storage system to the new standby database; and
    starting, via a standby database provisioning sub-module, another replication process between the primary database and the new standby database to replicate the primary database at the new standby database.

2. The method according to claim 1, further comprising:
    temporarily suspending, prior to taking the snapshot of the first standby database, the replication process between the primary database and the first standby database via the automated self-scaling database module,
    wherein the replication process synchronizes the first standby database to the primary database by replicating transactions at the primary database to the first standby database.

3. The method according to claim 2, further comprising:
    after taking the snapshot of the first standby database, resuming the replication process between the primary database and the first standby database via the automated self-scaling database module.

4. The method according to claim 1, wherein the automated self-scaling database system further comprises an application server, the method further comprising:
    notifying the application server, via the automated self-scaling database module, to start off-loading read-only requests to the new standby database.

5. The method according to claim 1, wherein the telemetry information comprises information that indicate one of more of: storage capacity or storage space utilization of the primary database and the first standby database, CPU utilization of the primary database and the first standby database, memory utilization of the primary database and the first standby database, number of active sessions at the primary database and the first standby database, connection wait time for connecting to the primary database and the first standby database, request response time of the primary database and the first standby database, storage throughput of the primary database and the first standby database in input/output per second (TOPS), and storage queue depth of the primary database and the first standby database.

6. A computing system comprising at least one processor and memory, wherein the memory comprises computer-executable instructions that are capable of causing the computing system to:
    start a replication process between a primary database and a first standby database via an automated self-scaling database module;
    analyze telemetry information from the primary database and the first standby database to determine whether there is the need for upscaling storage capacity and computation resources of an automated self-scaling database system for read operations; and
    when upscaling is needed for read operations, wherein the computer-executable instructions are capable of causing the computing system to:
    take a snapshot of the first standby database, wherein the snapshot is a complete copy of data stored in a storage system of the first standby database at a given time;

store the snapshot at a snapshot storage system;
automatically provision a new virtual machine (VM) for a new standby database;
start the new virtual machine (VM) for the new standby database;
automatically provision a new storage system for the new standby database;
assign the new standby database a standby database role in the database system;
restore the snapshot that was taken from the snapshot storage system to the new standby database; and
start, via a standby database provisioning sub-module, another replication process between the primary database and the new standby database to replicate the primary database at the new standby database.

7. The computing system according to claim 6, wherein the computer-executable instructions are further capable of causing the computing system to:
temporarily suspend, prior to taking the snapshot of the first standby database, the replication process between the primary database and the first standby database, wherein the replication process synchronizes the first standby database to the primary database by replicating transactions at the primary database to the first standby database.

8. The computing system according to claim 7, wherein the computer-executable instructions are further capable of causing the computing system to:
resume the replication process between the primary database and the first standby database after taking the snapshot of the first standby database.

9. The computing system according to claim 6, wherein the computer-executable instructions are further capable of causing the computing system to:
notify an application server to start off-loading read-only requests to the new standby database.

10. The computing system according to claim 6, wherein the telemetry information comprises information that indicate one of more of: storage capacity or storage space utilization of the primary database and the first standby database, CPU utilization of the primary database and the first standby database, memory utilization of the primary database and the first standby database, number of active sessions at the primary database and the first standby database, connection wait time for connecting to the primary database and the first standby database, request response time of the primary database and the first standby database, storage throughput of the primary database and the first standby database in input/output per second (TOPS), and storage queue depth of the primary database and the first standby database.

11. An automated self-scaling database system, comprising:
a primary database;
a first standby database comprising: a virtual machine having computation resources; and a storage system having storage capacity; and
an automated self-scaling database module in communication with the primary database and the first standby database, wherein the automated self-scaling database module starts a replication process between the primary database and the first standby database via the automated self-scaling database module, and wherein the automated self-scaling database module, comprises one or more processors configured to execute:
a database capacity monitoring sub-module that analyzes telemetry information from the primary database and the first standby database to determine whether there is the need for upscaling storage capacity and computation resources of the database system for read operations;
a snapshot application and management sub-module that takes a snapshot of the first standby database and stores the snapshot at a snapshot storage system, wherein the snapshot is a complete copy of data stored in a storage system of the first standby database at a given time;
a standby database provisioning sub-module that automatically initiates the upscaling to provision a new standby database when the database capacity monitoring sub-module of the automated self-scaling database module determines that upscaling storage capacity and computation resources of the database system for read operations is needed;
a virtual machine provisioning, migration, and management sub-module that automatically provisions a new virtual machine (VM) for the new standby database, starts the new virtual machine (VM) for the new standby database;
a storage throughput provisioning and management sub-module that automatically provisions a new storage system for the new standby database, wherein the standby database provisioning sub-module assigns the new standby database a standby database role in the database system, and
wherein the snapshot application and management sub-module restores the snapshot that was taken from the snapshot storage system to the new standby database, and wherein the automated self-scaling database module starts another replication process between the primary database and the new standby database to replicate the primary database at the new standby database.

12. The automated self-scaling database system according to claim 11, wherein the one or more processors of the automated self-scaling database module are further configured to execute:
the standby database provisioning sub-module to temporarily suspend, prior to taking the snapshot of the first standby database, the replication process between the primary database and the first standby database, wherein the replication process synchronizes the first standby database to the primary database by replicating transactions at the primary database to the first standby database.

13. The automated self-scaling database system according to claim 12, wherein the one or more processors of the automated self-scaling database module are further configured to execute:
the standby database provisioning sub-module to resume the replication process between the primary database and the first standby database after taking the snapshot of the first standby database.

14. The automated self-scaling database system according to claim 11, wherein the one or more processors of the automated self-scaling database module are further configured to execute:
a read-only application mode sub-module that notifies an application server to start off-loading read-only requests to the new standby database.

* * * * *